(12) United States Patent
Tjhang et al.

(10) Patent No.: US 8,916,816 B2
(45) Date of Patent: Dec. 23, 2014

(54) IMAGING SYSTEMS AND IMAGE FIBER BUNDLES FOR DOWNHOLE MEASUREMENT

(71) Applicants: Schlumberger Technology Corporation, Sugar Land, TX (US); The University of Tokyo, Bunkyo-ku (JP)

(72) Inventors: Theodorus Tjhang, Sagamihara (JP); Yutaka Imasato, Chiba (JP); Shigeo Daito, Yokohama (JP); Mohamad Nizam Harun, Yokohama (JP); Masatoshi Ishikawa, Kashiwa (JP)

(73) Assignees: Schlumberger Technology Corporation, Sugar Land, TX (US); The University of Tokyo, Bunkyo-ku (JP)

( * ) Notice: Subject to any disclaimer, the term of this patent is extended or adjusted under 35 U.S.C. 154(b) by 115 days.

(21) Appl. No.: 13/654,408

(22) Filed: Oct. 17, 2012

(65) Prior Publication Data

US 2014/0103203 A1   Apr. 17, 2014

(51) Int. Cl.
*G01V 5/08*   (2006.01)
*G01V 8/10*   (2006.01)
*G01V 8/24*   (2006.01)

(52) U.S. Cl.
CPC ... *G01V 8/10* (2013.01); *G01V 8/24* (2013.01)
USPC ..................................................... 250/269.1

(58) Field of Classification Search
CPC .. G01N 2201/0826; G01J 3/02; G01J 3/0218; G01V 8/24
USPC ............................ 250/269.1–269.8, 265–266
See application file for complete search history.

(56) References Cited

U.S. PATENT DOCUMENTS

| | | | | |
|---|---|---|---|---|
| 5,951,463 | A | * | 9/1999 | Lombardi et al. ............ 600/162 |
| 7,114,562 | B2 | | 10/2006 | Fisseler et al. |
| 2005/0263281 | A1 | * | 12/2005 | Lovell et al. ............... 166/255.1 |

* cited by examiner

*Primary Examiner* — Kiho Kim
(74) *Attorney, Agent, or Firm* — Daryl R. Wright; Jody DeStefanis

(57) ABSTRACT

An example system for downhole measurement disclosed herein comprises a tool to be positioned downhole in a formation, the tool comprising an imaging system to determine measurement information from imaging information obtained by sensing light, and an illumination system to control source light to be emitted by the tool. The system also comprises an optical cable to sense an optical field of view that is remote from the tool, the optical cable including an optical fiber bundle comprising a bundle of imaging fibers to convey the imaging information from a sensing end of the optical cable to the imaging system, and a plurality of illumination fibers positioned outside the bundle of imaging fibers, the illumination fibers to convey the source light from the tool to the sensing end of the cable, the illumination fibers to emit the source light to illuminate the optical field of view.

6 Claims, 14 Drawing Sheets

IMAGING SYSTEMS AND IMAGE FIBER BUNDLES FOR DOWNHOLE MEASUREMENT

FIELD OF THE DISCLOSURE

This disclosure relates generally to downhole measurement and, more particularly, to imaging systems and image fiber bundles for downhole measurement.

BACKGROUND

In many oilfield applications, such as deepwater and subterranean drilling applications, downhole measurement techniques can provide useful information concerning the characteristics of geological formations, fluid flows in the geological formations, objects present in the formation and/or the borehole, etc. However, some areas to be observed may be too space limited to be reached by prior downhole measurement/logging tools. Also, in some cases, the harshness of the environments in the areas to be observed may exceed the capabilities of prior downhole measurement/logging tools.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Example methods and systems disclosed herein relate generally to downhole measurement and, more particularly, to imaging systems and image fiber bundles for downhole measurement. A disclosed example system for downhole measurement includes a tool to be positioned downhole in a formation. The tool includes an imaging system to determine measurement information from imaging information obtained by sensing light, and an illumination system to control source light to be emitted by the tool. The example system also includes an optical cable to sense an optical field of view that is remote from the tool. The optical cable includes an optical fiber bundle to optically couple with the imaging system and the illumination system. In some examples, the optical fiber bundle includes a bundle of imaging fibers to convey the imaging information from a sensing end of the optical cable, along a length of the optical cable, to the imaging system. In some examples, the optical fiber bundle also includes a plurality of illumination fibers, positioned outside the bundle of imaging fibers, to convey the source light from the tool, along the length of the optical cable, to the sensing end of the cable. The illumination fibers are to emit the source light to illuminate the optical field of view.

A disclosed example optical cable for downhole imaging applications includes an optical fiber bundle, which includes a bundle of imaging fibers to convey imaging information along a length of the optical cable. For example, the optical fiber bundle could be implemented by, but is not limited to, a fiber optic image conduit containing fused glass optical fiber rods with polished faces. The example optical cable also includes a fluid conveying region located between an exterior surface of the optical fiber bundle and an interior surface of the optical cable. The example optical cable further includes a nozzle included in a sleeve covering a sensing end of the optical cable. The nozzle is positioned over the fluid conveying region to emit fluid conveyed via the fluid conveying region.

A disclosed example method for downhole measurement includes positioning a tool downhole in a formation. The tool includes an imaging system to determine measurement information from imaging information obtained by sensing light, and an illumination system to control source light to be emitted by the tool. The example method also includes using an optical cable to sense an optical field of view that is remote from the tool. The optical cable includes an optical fiber bundle to optically couple with the imaging system and the illumination system. In some examples, the optical fiber bundle includes a bundle of imaging fibers to convey the imaging information from a sensing end of the optical cable, along a length of the optical cable, to the imaging system. In some examples, the optical fiber bundle also includes a plurality of illumination fibers, positioned outside the bundle of imaging fibers, to convey the source light from the tool, along the length of the optical cable, to the sensing end of the cable. The illumination fibers are to emit the source light to illuminate the optical field of view.

BRIEF DESCRIPTION OF THE DRAWINGS

Example imaging systems and image fiber bundles for downhole measurement are described with reference to the following figures. Where possible, the same numbers are used throughout the figures to reference like features and components.

DETAILED DESCRIPTION

Figure 1:
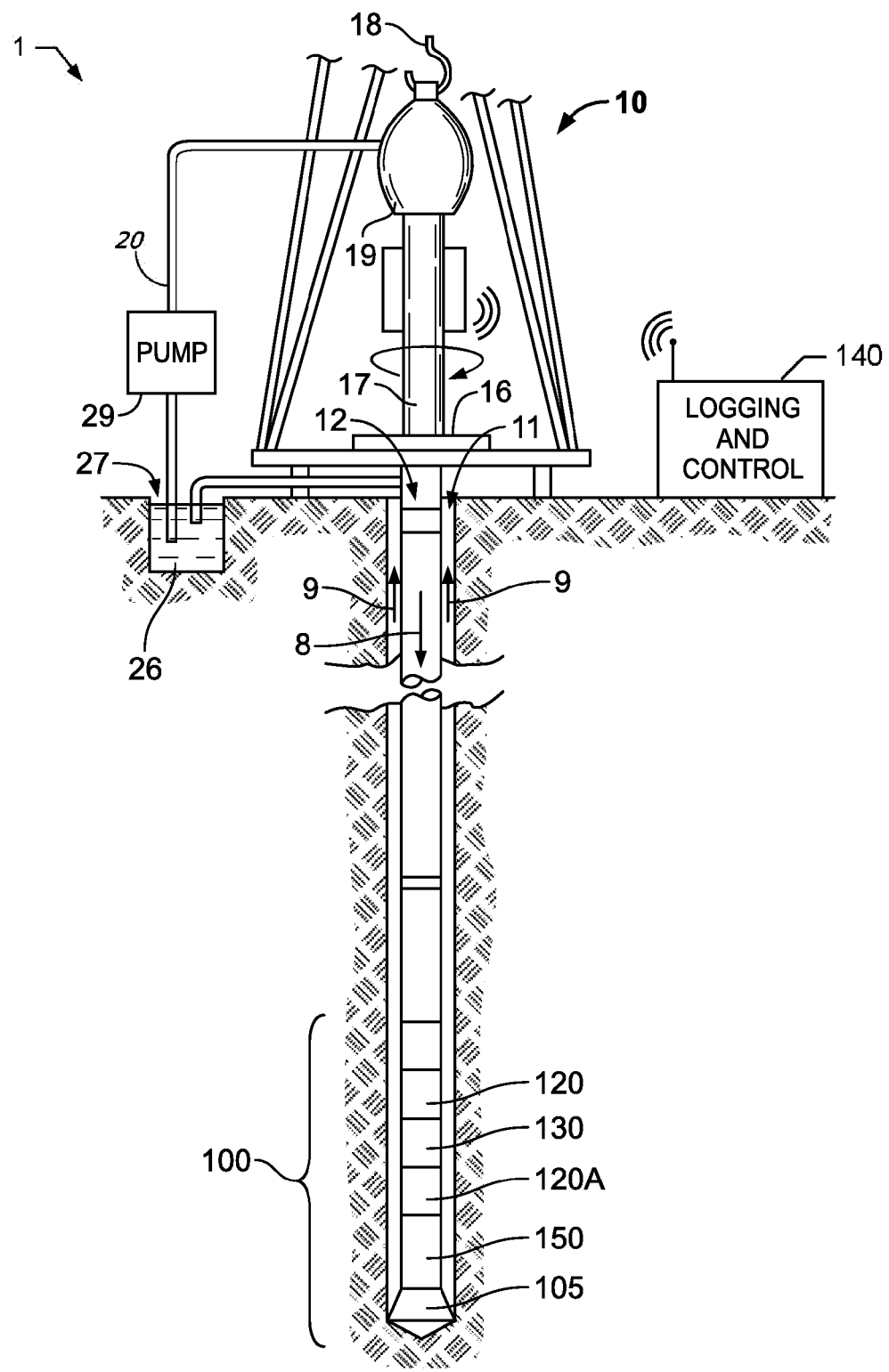
FIG. 1 is a block diagram illustrating an example wellsite system capable of supporting imaging systems and image fiber bundles for downhole measurement as disclosed herein.

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the disclosure.

Prior downhole measurement techniques, especially those employing cameras and/or other optical processing, may be unusable in applications in which the area to be measured is space-limited. Such space limitation may be due to, for example, size constraints of the downhole logging equipment, such as tool diameter, connector configuration, etc. In some scenarios, the space limitation may be due to features of the well borehole and/or the formation, such as in measurement applications involving a small annulus diameter well, a small annulus inside a formation, etc. Prior optical downhole measurement techniques may also be unusable in areas exhibiting harsh environments, such as high temperatures, pressures, etc., that exceed the capabilities/ratings of the downhole logging equipment.

To overcome at least some of the foregoing problems, imaging systems and image fiber bundles for downhole measurement disclosed herein employ example optical cables containing image fiber bundles that can be guided from a logging tool to a remote observation area that is space limited and/or that has a harsh environment to thereby sense an optical field of view in the remote area. Such an example optical cable can use its image fiber bundle to convey the sensed imaging information in the remote optical field of view back to an example imaging system included in the logging tool that is being used to perform downhole measurements. Some disclosed example optical cables also include illumination fibers in an optical fiber bundle that also contains the cable's image fiber bundle. For example, the illumination fibers can be positioned outside (e.g., surrounding) the image fiber bundle to convey light from a light source (e.g., in the logging tool) and along the length of the optical cable for emission at the sensing end of the optical cable to thereby illuminate the remote field of view. Such illumination can improve the quality of the imaging information sensed by the image fiber bundle and conveyed via the image fiber bundle back to the imaging system in the logging tool.

Some disclosed example optical cables additionally or alternatively include a fluid conveying region located between an exterior surface of the optical fiber bundle (e.g., containing the image fiber bundle) and an interior surface of the optical cable. Such example optical cables also include one or more nozzles in a sleeve covering the sensing end of the optical cable, which is to be positioned in the remote observation area. The nozzle(s) are positioned over the fluid conveying region to emit (e.g., to direct and/or diffuse) flushing fluid conveyed via the fluid conveying region from a fluid source (e.g., provided by the logging tool) to the sensing end of the optical cable. In some examples, the fluid conveying region in the optical cable includes a plurality of channels formed between the exterior surface of the optical fiber bundle and the interior surface of the optical cable. In such examples, one or more nozzles may be positioned to cover a single one of the channels. In other examples, the fluid conveying region in the optical cable includes one or more fluid conveying tubes that extend through the length of the optical cable and that are terminated by the one or more nozzles.

Turning to the figures, FIG. 1 illustrates an example wellsite system 1 in which disclosed example imaging systems and image fiber bundles can be employed for downhole measurement. The wellsite can be onshore or offshore. In this example system, a borehole 11 is formed in subsurface formations by rotary drilling, whereas other example systems can use directional drilling.

A drillstring 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. In an example, the drill string 12 is suspended from a lifting gear (not shown) via the hook 18, with the lifting gear being coupled to a mast (not shown) rising above the surface. An example lifting gear includes a crown block whose axis is affixed to the top of the mast, a vertically traveling block to which the hook 18 is attached, and a cable passing through the crown block and the vertically traveling block. In such an example, one end of the cable is affixed to an anchor point, whereas the other end is affixed to a winch to raise and lower the hook 18 and the drillstring 12 coupled thereto. The drillstring 12 is formed of drill pipes screwed one to another.

The drillstring 12 may be raised and lowered by turning the lifting gear with the winch. In some scenarios, drill pipe raising and lowering operations require the drillstring 12 to be unhooked temporarily from the lifting gear. In such scenarios, the drillstring 12 can be supported by blocking it with wedges in a conical recess of the rotary table 16, which is mounted on a platform 21 through which the drillstring 12 passes.

In the illustrated example, the drillstring 12 is rotated by the rotary table 16, energized by means not shown, which engages the kelly 17 at the upper end of the drillstring 12. The drillstring 12 is suspended from the hook 18, attached to a traveling block (also not shown), through the kelly 17 and the rotary swivel 19, which permits rotation of the drillstring 12 relative to the hook 18. In some examples, a top drive system could be used.

In the illustrated example, the surface system further includes drilling fluid or mud 26 stored in a pit 27 formed at the well site. A pump 29 delivers the drilling fluid 26 to the interior of the drillstring 12 via a hose 20 coupled to a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 includes one or more specially-made drill collars near the drill bit 105. Each such drill collar has one or more logging devices mounted on or in it, thereby allowing downhole drilling conditions and/or various characteristic properties of the geological formation (e.g., such as layers of rock or other material) intersected by the borehole 11 to be measured as the borehole 11 is deepened. In particular, the bottom hole assembly 100 of the illustrated example system 1 includes a logging-while-drilling (LWD) module 120, a measuring-while-drilling (MWD) module 130, a roto-steerable system and motor 150, and the drill bit 105.

The LWD module 120 is housed in a drill collar and can contain one or a plurality of logging tools. It will also be understood that more than one LWD and/or MWD module can be employed, e.g. as represented at 120A. (References, throughout, to a module at the position of 120 can mean a module at the position of 120A as well.) The LWD module 120 includes capabilities for measuring, processing, and storing information, as well as for communicating with the surface equipment.

The MWD module 130 is also housed in a drill collar and can contain one or more devices for measuring characteristics of the drillstring 12 and drill bit 105. The MWD module 130 further includes an apparatus (not shown) for generating electrical power to the downhole system. This may include a mud turbine generator powered by the flow of the drilling fluid, it being understood that other power and/or battery systems may be employed. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The wellsite system 1 also includes a logging and control unit 140 communicably coupled in any appropriate manner to the LWD module 120/120A and the MWD module 130. In the illustrated example, the LWD module 120/120A and/or the MWD module 130 can implement an example imaging system employing an optical fiber bundle to perform downhole measurements as disclosed herein. For example, the LWD module 120/120A and/or the MWD module 130 may include imaging systems (and also associated illumination systems, flushing systems, orientation controllers, etc.) that, in conjunction with example optical cables containing image fiber bundles as disclosed herein, are able to perform downhole measurements in, for example, space-limited areas, harsh environments, etc. The LWD module 120/120A and/or the MWD module 130 may report the measurement data to the logging and control unit 140. Example imaging systems and optical cables for performing downhole measurements are described in greater detail below. Also, the example imaging systems and optical cables disclosed herein are described in the context of LWD and MWD applications, the example imaging systems and optical cables are not limited thereto. Instead, the example imaging systems and optical cables disclosed herein can also be used in other applications, such as wireline logging, production logging, permanent logging, fluid analysis, formation evaluation, sampling-while-drilling, etc.

Figure 2:
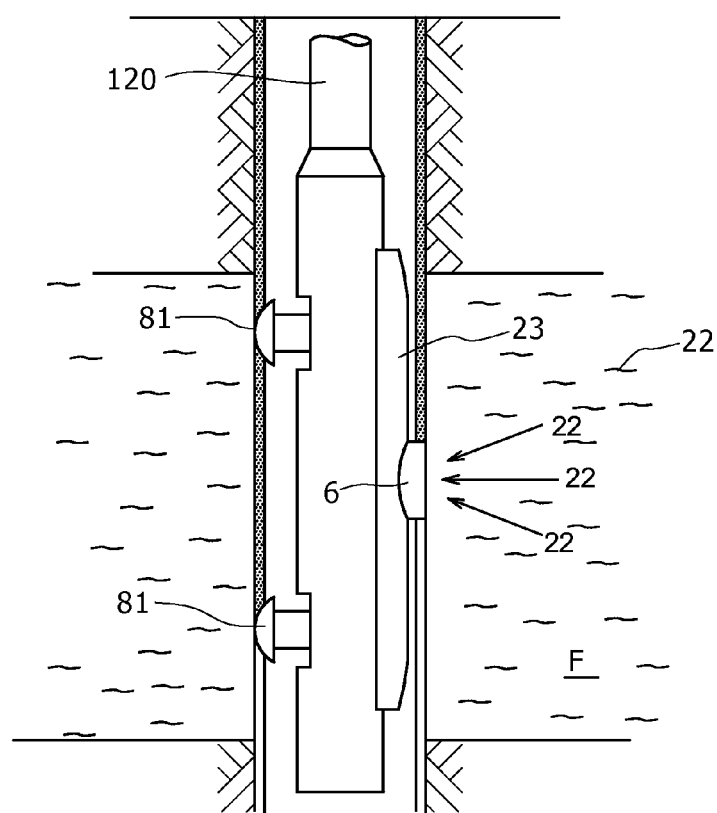
FIG. 2 is a block diagram illustrating an example sampling-while-drilling logging device capable of supporting imaging systems and image fiber bundles for downhole measurement as disclosed herein.

For example, FIG. 2 is a simplified diagram of an example sampling-while-drilling logging device of a type described in U.S. Pat. No. 7,114,562, incorporated herein by reference, utilized as the LWD tool 120 or part of an LWD tool suite 120A, in which imaging systems and image fiber bundles for downhole measurement as disclosed herein can be used. The LWD tool 120 is provided with a probe 6 for establishing fluid communication with the formation and drawing the fluid 22 into the tool, as indicated by the arrows. The probe may be positioned in a stabilizer blade 23 of the LWD tool and extended therefrom to engage the borehole wall. The stabilizer blade 23 comprises one or more blades that are in contact with the borehole wall. Fluid drawn into the downhole tool using the probe 6 may be measured to determine, for example, pretest and/or pressure parameters. Additionally, the LWD tool 120 may be provided with devices, such as sample chambers, for collecting fluid samples for retrieval at the surface. Backup pistons 81 may also be provided to assist in applying force to push the drilling tool and/or probe against the borehole wall.

Figure 3:
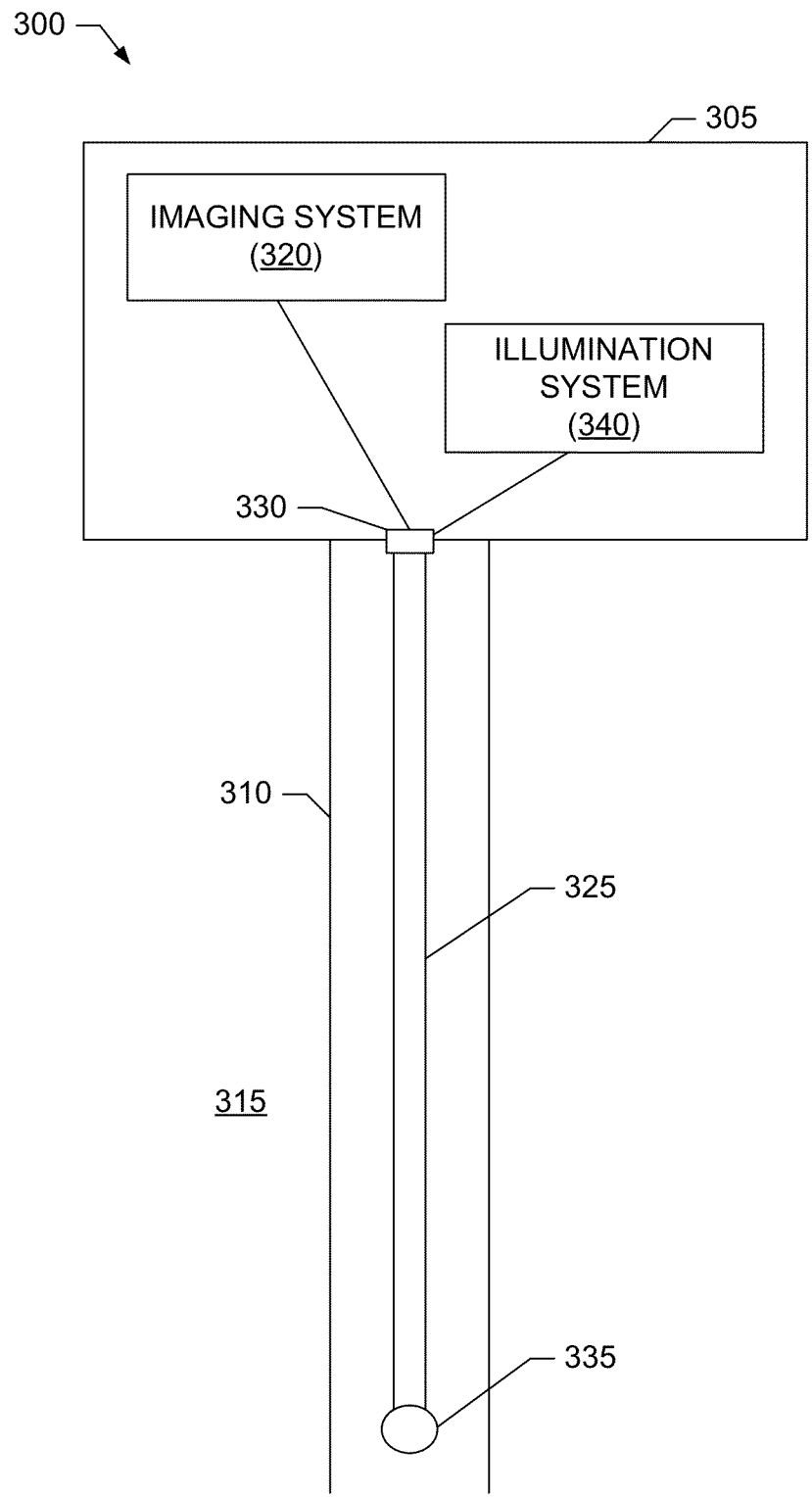
FIG. 3 is a block diagram illustrating a first example measurement tool to perform downhole measurements using an example imaging system and an example optical cable containing an image fiber bundle.

A first example system 300 including an example downhole measurement tool 305 capable of performing downhole measurements in accordance with the example techniques disclosed herein is illustrated in FIG. 3. The system 300 can correspond to the example wellsite system 1, and the downhole measurement tool 305 can correspond to one or more of the LWD module 120/120A and/or the MWD module 130 of FIG. 1. The downhole measurement tool 305 can also correspond to the example sampling-while-drilling logging device of FIG. 2.

The downhole measurement tool 305 of the illustrated example is positioned downhole in a borehole 310 of a geological formation 315. The downhole measurement tool 305 includes an example imaging system 320 to determine downhole measurement information from imaging information that is obtained by sensing light in a downhole observation area. The imaging system 320 can be implemented by one or more cameras, one or more imaging sensors, one or more imaging processors 802 described below in conjunction with FIG. 8, etc. In some examples, the imaging system 320 determines positioning data (e.g., such as location information, boundary information, etc.) for object(s) represented in the imaging information (e.g., in the sensed light) obtained from the downhole observation area. In the illustrated example, the imaging system 320 reports its determined measurement information via a telemetry communication link (not shown) to a receiver that is located outside the formation 315, such as the logging and control unit 140 of FIG. 1.

In the illustrated example system 300 of FIG. 3, the imaging system 320 is optically coupled with an example optical cable 325 at an interface end 330 of the optical cable 325. In the illustrated example, a sensing end 335 of the optical cable 325 is guided down the borehole 310 to the observation area in which measurements are to be performed. In some examples, the optical cable 325 is constructed to have a diameter sufficiently small to be conveyed, for example, into a small annulus well to measure characteristics of the borehole, mudcake, formation wall, and/or to be conveyed into a perforation annulus of a formation, etc. As described in greater detail below, the optical cable 325 includes an optical fiber bundle that further includes at least an image fiber bundle that is to sense light in a field of view of the sensing end 335 of the optical cable 325. The image fiber conveys the sensed light, also referred to herein as the imaging information, from the sensing end 335, along a length of the optical cable 325, and to the imaging system 320 for processing.

The downhole measurement tool 305 of FIG. 3 also includes an example illumination system 340 providing a light source to be used to illuminate the observation area in which measurements are to be performed. In the illustrated example, the illumination system 340 is optically coupled with the interface end 330 of the optical cable 325 and, in particular, with one or more illumination fibers included in the optical fiber bundle of the optical cable 325. As described in greater detail below, the optical fiber bundle of the optical cable 325 can include one or more illumination fibers that are positioned outside the imaging fiber bundle. The illumination fiber(s) convey the source light provided by the illumination system 340 from the tool 305, along the length of the optical cable 325, and to the sensing end 335 of the cable 325. The illumination fiber(s) emit the source light to thereby illuminate an optical field of view in the remote observation area.

Figure 4:
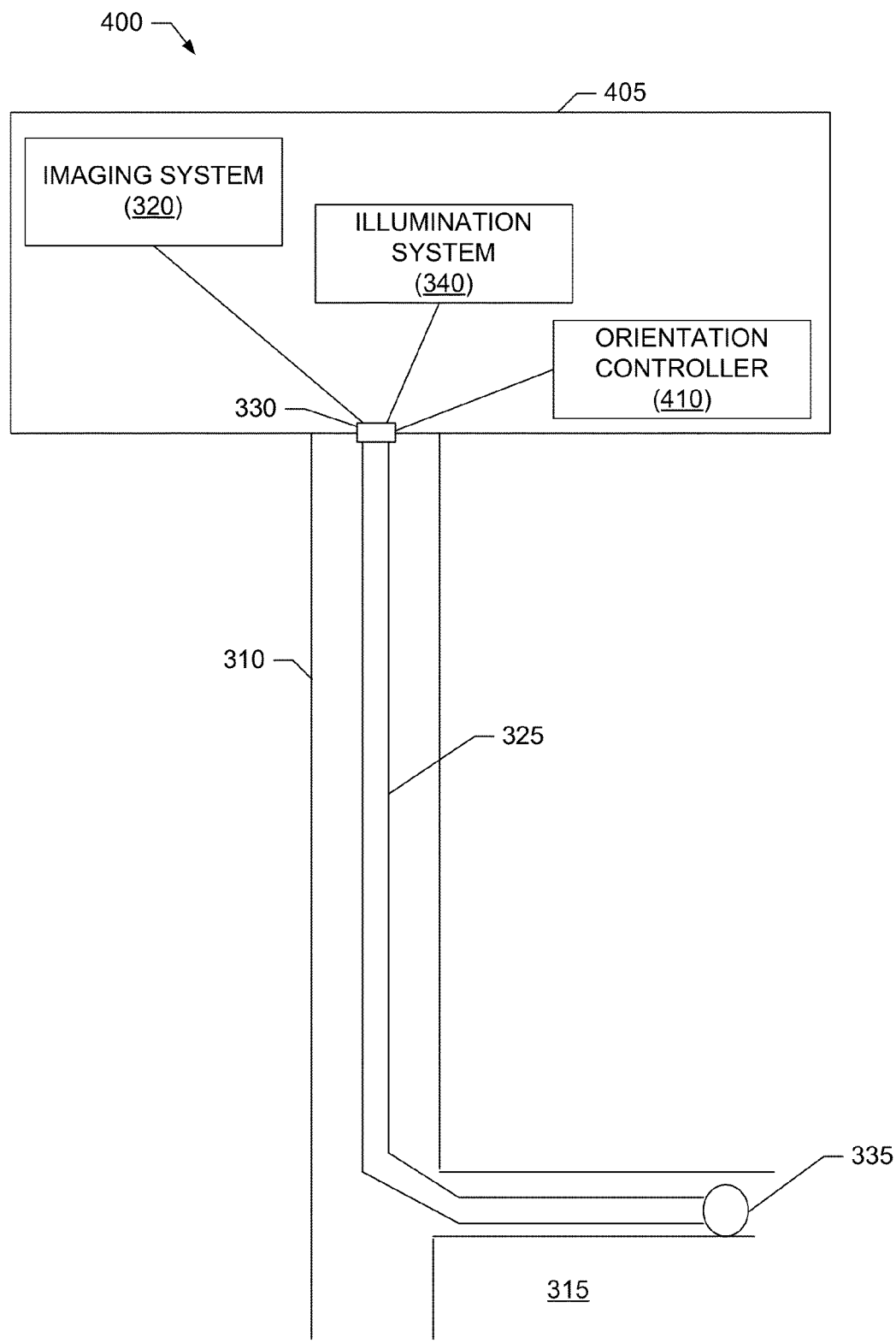
FIG. 4 is a block diagram illustrating a second example measurement tool to perform downhole measurements using an example imaging system and an example optical cable containing an image fiber bundle.

A second example system 400 including an example downhole measurement tool 405 capable of performing downhole measurements in accordance with the example techniques disclosed herein is illustrated in FIG. 4. The system 400 can correspond to the example wellsite system 1, and the downhole measurement tool 405 can correspond to one or more of the LWD module 120/120A and/or the MWD module 130 of FIG. 1. The downhole measurement tool 405 can also correspond to the example sampling-while-drilling logging device of FIG. 2.

The second example system 400 includes many elements in common with the first example system 300 of FIG. 3. As such, like elements in FIGS. 3 and 4 are labeled with the same reference numerals. The detailed descriptions of these like elements are provided above in connection with the discussion of FIG. 3 and, in the interest of brevity, are not repeated in the discussion of FIG. 4. For example, the downhole measurement tool 405 of FIG. 4 includes the imaging system 320 and the illumination system 340 that are to interface with the interface end 330 of the optical cable 325. Also, in the example system 400 of FIG. 4, like in the example system 300 of FIG. 3, the sensing end 335 of the optical cable 325 is guided down the borehole 310 to the observation area in the formation 315 in which measurements are to be performed.

However, in the illustrated example system 400 of FIG. 4, the downhole measurement tool 405 also includes an example orientation controller 410 that is to interface with interface end 330 of the optical cable 325. In the illustrated example, the orientation controller 410 includes one or more actuators to mechanically couple, at the interface end 330 of the optical cable 325, with one or more force transmission cables (e.g., such as one or more Bowden cables) that are included in and/or attached to the optical cable 325. The force transmission cable(s) transmit mechanical force(s) along the length of the optical cable 325 to thereby move the sensing end 335 of the cable 325 to control its orientation (e.g., position, angle, etc.). For example, N force transmission cables, which are controllable via N actuators included in the orientation controller 410, can be included in and/or attached to the optical cable 325 to control movement of the sensing end 335 of the cable 325 in N directions, where N is greater than or equal to one.

Figure 5:
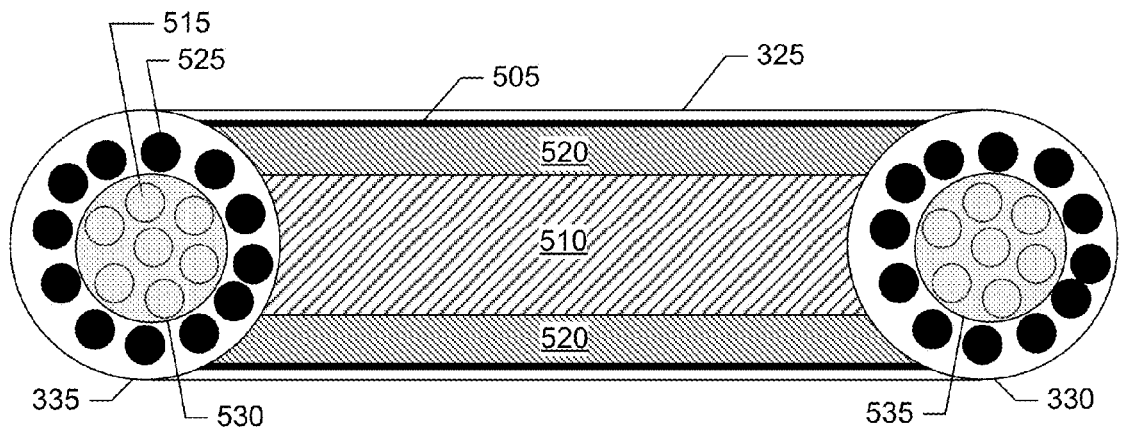
FIG. 5 is a schematic illustration of a first example optical cable that can be used with the example measurement tools of FIGS. 3 and/or 4.

An example implementation of the optical cable 325 included in the systems 300 and 400 of FIGS. 3 and 4, respectively, is illustrated in FIG. 5. The illustrated example optical cable 325 includes an example optical fiber bundle 505. The optical fiber bundle 505 includes an example imaging fiber bundle 510 containing a bundle of imaging fibers 515. The imaging fibers 515 included in the imaging fiber bundle 510 are arranged coherently to enable imaging information (e.g., sensed light) to be conveyed along the length of the cable 325 from its sensing end 335 to its interface end 330.

In the illustrated example, the optical fiber bundle 505 also includes an example illumination fiber bundle 520 containing a bundle of illumination fibers 525. As shown in the example of FIG. 5, the illumination fibers 525 are positioned outside the imaging fiber bundle 510 and, for example, may surround the imaging fiber bundle 510. The illumination fibers 525 included in the illumination fiber bundle 520 convey source light along the length of the cable 325 from its interface end 330 to its sensing end 335 to illuminate a field of view and, thus, can be arranged coherently or incoherently. In some examples, a physical barrier implemented using any appropriate material may be formed between the imaging fiber bundle 510 and the illumination fiber bundle 520 to reduce the amount of source light being conveyed by the illumination fiber bundle 520 that can spill over and, thus, add interference to the imaging information (e.g., sensed light) being conveyed by the imaging fiber bundle 510. In some examples, the imaging fibers 515 and the illumination fibers 525 may be constructed to have different (e.g., orthogonal) polarizations to reduce the amount of source light from the illumination fiber bundle 520 that can spill over and add interference to the imaging information (e.g., sensed light) conveyed by the imaging fiber bundle 510.

Figure 8:
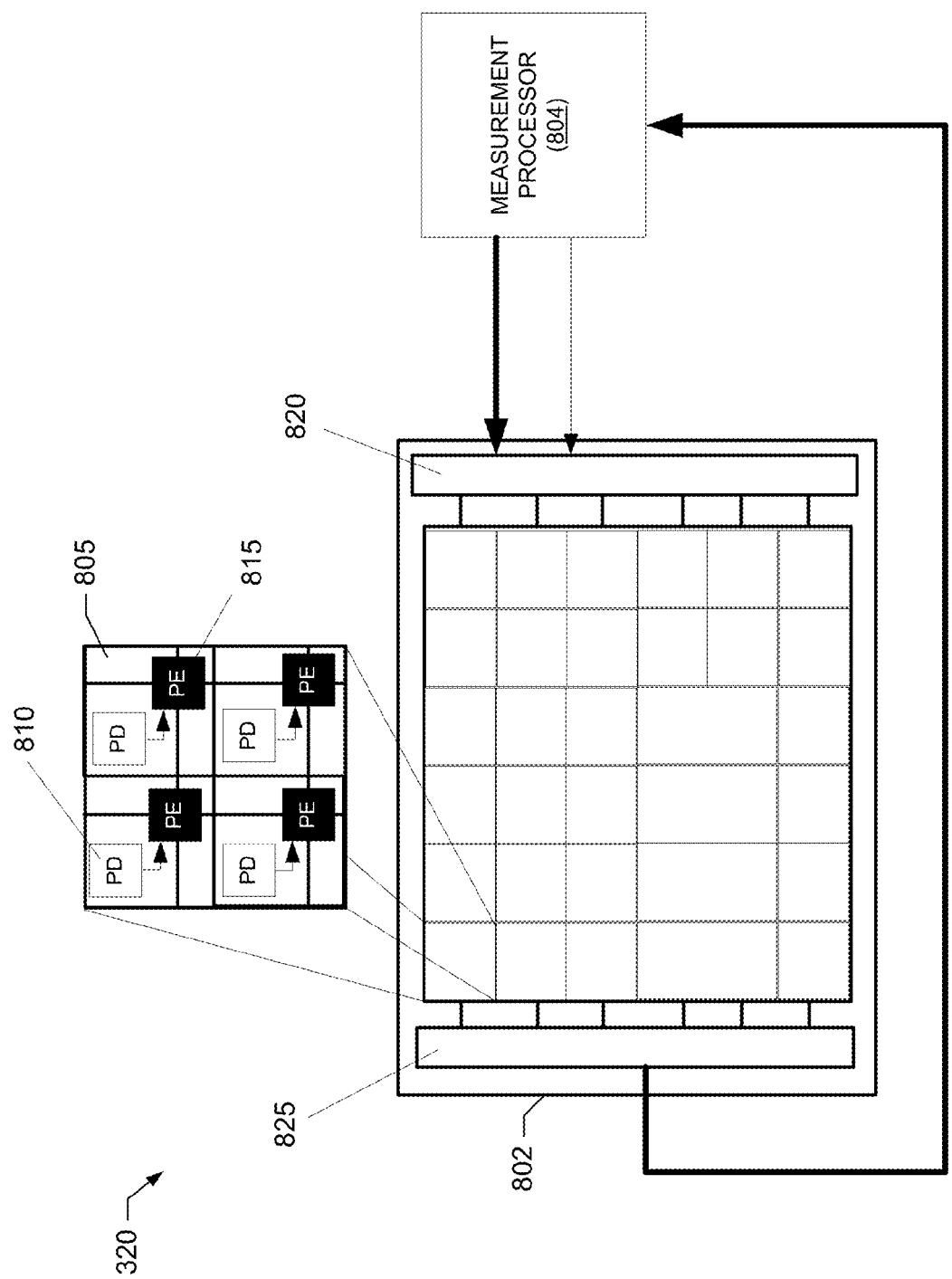
FIG. 8 illustrates an example imaging system including an example imaging processor and an example measurement processor that may be used to implement one or more of the example measurement tools of FIGS. 3, 4 and/or 7.

In the illustrated example of FIG. 5, the optical cable 325 includes an example sensing lens 530 that is positioned over the imaging fiber bundle 510 at the sensing end 335 of the optical cable 325. The sensing lens 530 focuses sensed light, which is sensed in a field of view at the sensing end 335 of the optical cable 325, over the imaging fibers 515 included in the imaging fiber bundle 510. In the illustrated example of FIG. 5, the optical cable 325 also includes an example interface lens 535 that is positioned over the imaging fiber bundle 510 at the interface end 330 of the optical cable 325. The interface lens 535 focuses the sensed light, which is conveyed from along the length of the imaging fiber bundle 510 included the optical cable 325, for detection by the imaging system 320 that is to optically couple with the interface end 330 of the optical cable 325. For example, the interface lens 535 can focus the sensed light for detection by a plurality of photodetectors 905 included in an example imaging processor 802 used to implement imaging system 320. The example imaging processor 802 is illustrated in FIG. 8, which is described in greater detail below.

Figure 6A:
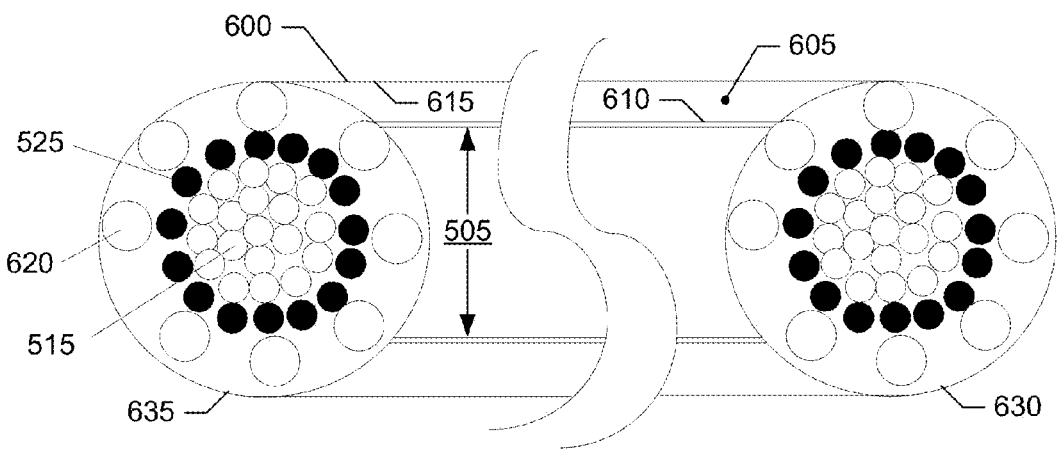
FIGS. 6A-C collectively provide a schematic illustration of a second example optical cable that can be used with the example measurement tools of FIGS. 3, 4 and/or 7.
Figure 6B:
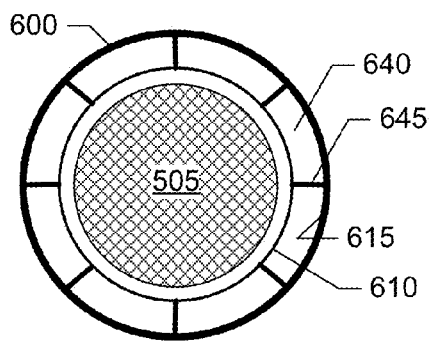
Figure 6C:
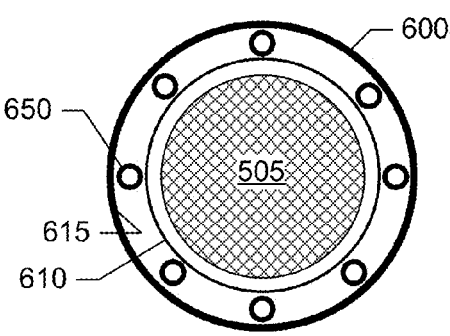

FIGS. 6A-C collectively illustrate a second example optical cable 600 that can be used with imaging systems to perform downhole measurements as disclosed herein. Like the cable 325 illustrated in FIG. 5, the optical cable 600 of FIGS. 6A-C includes the optical fiber bundle 505 that further includes the imaging fiber bundle 510 containing the bundle of imaging fibers 515, and the illumination fiber bundle 520 containing the bundle of illumination fibers 525. Illustrations of the imaging fiber bundle 510, the illumination fiber bundle 520, as well as the sensing lens 530 at the interface lens 535, which are included in the optical cable 600 as in the cable 325 of FIG. 5, are omitted from FIGS. 6A-C to improve clarity.

The illustrated example optical cable 600 also includes an example fluid conveying region 605 that is located between an exterior surface 610 of the optical fiber bundle 505 and an interior surface 615 of the optical cable 600. The fluid conveying region 605 extending the length of the optical cable 600, from the cable's interface end 630 to its sensing end 635). The optical cable 600 further includes a set of one or more nozzles 620 that are formed or otherwise included in a sleeve (not shown) covering the sensing end 635 of the optical cable 600. In the illustrated example, the nozzle(s) 620 are positioned over the fluid conveying region 605 to enable flushing fluid conveyed along the length of the cable 600 via the fluid conveying region 600 to be emitted at the sensing end 635 of the optical cable 600. The nozzle(s) 620 can direct and/or diffuse the flushing fluid to be emitted at the sensing end 635 of the optical cable 600. As such, the nozzle(s) 620 can protrude from, be flush with, or be recessed from sensing end 635 of the cable 600. Also, the nozzle(s) 620 can be formed to have any type of shape. For example, the nozzle(s) 620 can be circular or cylindrical, rectangular (e.g., forming a grating), etc.

FIG. 6B is a cross-sectional view of the optical cable 600 that illustrates a first example implementation of the fluid conveying region 605. In the illustrated example implementation of FIG. 6B, the fluid conveying region 605 includes a set of channels 640 formed between the exterior surface 610 of the optical fiber bundle 505 and the interior surface 615 of the optical cable 600. The channels 640 extend through the length of the optical cable 600 and are created by forming walls 645 (or any other type of dividers 645) between the exterior surface 610 of the optical fiber bundle 505 and the interior surface 615 of the optical cable 600, as shown. In some examples, the channels 640 have larger cross sectional area and are fewer in number than the nozzles 620. In such examples, multiple nozzles 620 may be positioned over one or more, or each, of the channel 640 to emit (e.g., direct and/or diffuse) the flushing fluid that is conveyed by the respective channel 640.

FIG. 6C is a cross-sectional view of the optical cable 600 that illustrates a second example implementation of the fluid conveying region 605. In the illustrated example implementation of FIG. 6C, the fluid conveying region 605 includes one or more example fluid conveying tubes 650 placed between the exterior surface 610 of the optical fiber bundle 505 and the interior surface 615 of the optical cable 600. The fluid conveying tube(s) 650 extend the length of the optical cable 600. In some examples, each of the fluid conveying tube(s) 650 corresponds to a respective one of the nozzle(s) 620. In such examples, each nozzle 620 may be positioned over its respective fluid conveying tube 650 to emit (e.g., direct and/or diffuse) the flushing fluid that is conveyed by the respective fluid conveying tube 650.

Figure 7:
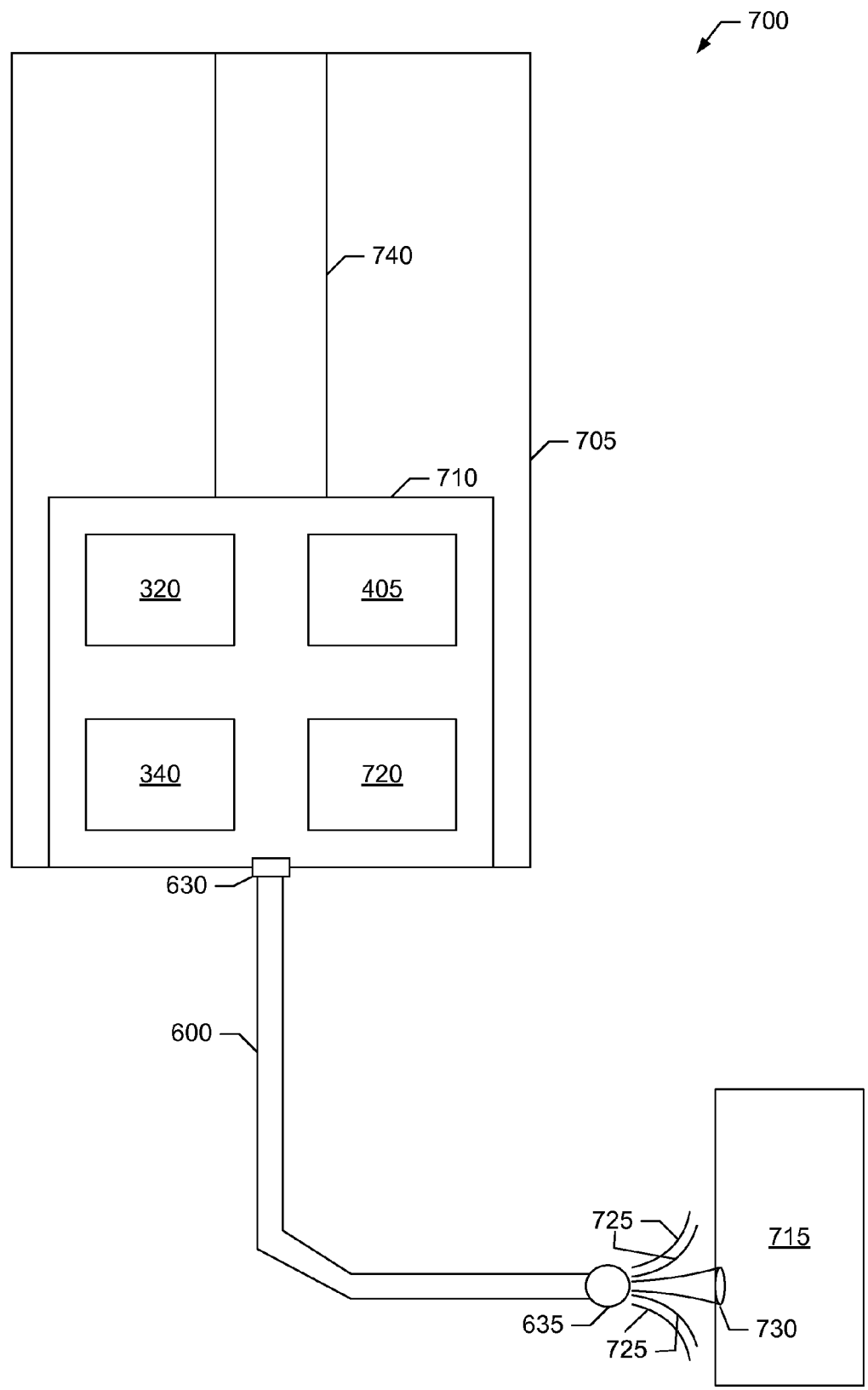
FIG. 7 is a block diagram illustrating a third example logging tool to perform downhole measurements using an example imaging system and the example optical cable of FIGS. 6A-C.

A third example system 700 that includes an example downhole measurement tool 705 employing the example optical cable 600 of FIG. 6 to perform downhole measurements in accordance with the example techniques disclosed herein is illustrated in FIG. 7. The system 700 can correspond to the example wellsite system 1, and the downhole measurement tool 705 can correspond to one or more of the LWD module 120/120A and/or the MWD module 130 of FIG. 1. The downhole measurement tool 705 can also correspond to the example sampling-while-drilling logging device of FIG. 2.

The third example system 700 includes many elements in common with the example systems 300 and 400 of FIGS. 3 and 4, respectively. As such, like elements in FIGS. 3, 4 and 7 are labeled with the same reference numerals. The detailed descriptions of these like elements are provided above in connection with the discussions of FIGS. 3-4 and, in the interest of brevity, are not repeated in the discussion of FIG. 7. For example, the downhole measurement tool 705 of FIG. 7 includes an example imaging assembly 710 that contains the imaging system 320, the illumination system 340 and the orientation controller 410 that are to interface with the interface end 630 of the optical cable 600, as described above. Also, in the example system 700 of FIG. 7, like in the example system 400 of FIG. 4, the sensing end 635 of the optical cable 600 is guided down a borehole (not shown) to an observation area in which measurements are to be performed for an example object 715.

However, in the illustrated example system 700 of FIG. 7, the downhole measurement tool 705 also includes an example flushing system 720 that is to interface with the interface end 630 of the optical cable 600. The flushing system 720 provides flushing fluid that is to be conveyed via the optical cable 600 (e.g., via its fluid conveying region 605) to the sensing end 635 of the optical cable. As described above, the optical cable 600 includes nozzle(s) (e.g., the nozzle(s) 620) to emit (e.g., project) the flushing fluid 725 from the sensing end 635 of the optical cable 600. The flushing fluid 725 can be emitted from the optical cable 600 for many purposes, such as, but not limited to, cleaning the optical fields-of-view at the sensing end 635 of the optical cable 600 (e.g., which may contain an opaque fluid), cleaning the optics (e.g., the sensing lens 530, etc.) at the sensing end 635 of the optical cable 600, cleaning the surface of the object(s) 715 at target area(s) 730, etc.

In some examples, the flushing fluid is pumped from a reservoir to the measurement tool 705 (for use by the flushing system 720) via an example fluid pumping flowline 740 implemented by, for example, coiled tubing, a drilling pipe, etc. The flushing fluid can be, for example, air (e.g., oxygen), nitrogen, water or some other substantially transparent fluid, etc. In some examples, the flushing fluid 725 can be obtained locally at the measurement tool 705 via filtering of at least one of drilling fluid, completion fluid or production fluid, or via chemical separation of substantially transparent fluid from the drilling fluid, completion fluid or production fluid, etc. In some examples, the flushing system 720 includes one or more valves that can be opened and closed to control that times and durations of flushing fluid projection at the sensing end 635 of the optical cable 600.

The imaging system 320 included in the measurement tools 305, 405 and 705 of FIGS. 3, 4 and 7 capture images of object(s) 715 or target(s) 730 for use in determining position measurements of the object(s)/target(s). In the illustrated examples, the imaging system 320 is positioned downhole in a borehole or wellbore in a formation, or in a subsea or deepwater environment, or any other remote environment, to perform light sensing, image capturing and high-speed (e.g., real-time) image processing of the sensed image data at the measurement tool 305/405/705.

In some examples, and as described in greater detail below, the imaging system 320 can include a respective array of photo detectors to determine image data by sensing light in a field-of-view of the sensing end 335/635 of the optical cable 320/600. In such examples, the imaging system 320 further includes a respective array of processing elements associated with the array of photo detectors to process the image data to determine, for example, object boundary information for an object 715, a target 730, etc. Example implementations of the imaging system 320 are described in greater detail below.

In some examples, the processed image data determined by the imaging system 320 is further processed and formatted by an example measurement processor (described in greater detail below), which is included in the imaging system 320, to determine positioning data (e.g., location data, object boundary data, etc.) to be reported via a communication link, such as a telemetry link, to the logging and control unit 140, etc., located on the surface or otherwise outside the remote environment in which measurements are being performed. The positioning data received from the imaging system 320 can be processed to determine a number of objects 715 in the field-of-view, size(s) of object(s) 715 in the field-of-view, characteristics(s) of object(s) 715 in the field-of-view, etc., or any combination thereof.

Because the imaging system 320 performs the bulk of its processing downhole and reports just a relatively small amount of measurement data to the surface (e.g., to the logging and control unit 140), the imaging system 320 can provide useful measurement data using a relatively low bandwidth telemetry communication link. Such a telemetry communication link can be implemented by almost any type of communication link, even existing telemetry links used today, unlike other prior optical-based measurement techniques that require high-speed communication links to transmit high-bandwidth image and/or video signals to the surface.

The measurement data provided by the imaging system 320 can be used to perform a wide variety of fluid analyses, such as, but not limited to: 1) real-time bubble point detection; 2) simultaneous shown-up detection from multiple bubbles at a time; 3) water/gas holdup measurement, including simultaneous counting of multiple bubble for a production logging application; and/or 4) quantitative image measurement (e.g., fluid color, bubble size/volume, water/gas percentage in oil, etc.). In some examples, the measurement tool 705 of FIG. 7 includes an example dye injector (not shown) to inject dyes (e.g., via the fluid conveying region 605 of the optical cable 600) and enable tracking of dyes in the remote observation area (e.g., to measure fluid flow). In some examples, the imaging system 320 can be used to observe surface conditions of the borehole, surface conditions of the casing, etc. (e.g., by sensing light reflected by the surface of the borehole, casing, etc., where the light has been emitted by the sensing end 335/635 of the optical cable 325/600, which is positioned to illuminate the surface of the borehole, casing, etc.).

Bubble detection as performed by the imaging system 320 can include detection of methane hydrates-derived bubbles. The production of methane hydrate generally occurs in a low temperature environment. In this case, the imaging system 320 can be operated in a low temperature environment without any cooling devices or cooling methods.

In some examples, the imaging system 320 is configured to detect sand production in a drilling environment. For example, using the imaging techniques described above for object location, size and number determination, the imaging system 320 can detect (e.g., in real-time) the size of any sand particles in formation fluid in the region of the sensing end 335/635 of the optical cable 325/600, and/or the quantity of the particles, to provide early sand production information to an operator. Based on such reported information, one or more preventative steps, such as installation of screening, can be taken to avoid any further sand production that can damage the well.

In some examples, the system 700 can be included in a downhole tool, such as the Cased Hole Dynamics Tester™ by Schlumberger®, having the ability to drill through a cased borehole and into the formation. In such examples, the optical cable 600 of the system 700 can be inserted into the drilled hole to examine the formation behind the casing. The optical cable 600 in this and other examples can be implemented by, but is not limited to, a fiber optic image conduit containing fused glass optical fiber rods with polished faces.

FIG. 8 illustrates a first example implementation of the imaging system 320 described above. In the example of FIG. 8, the imaging system 320 includes an example imaging processor 802 and an example measurement processor 804. In the illustrated example of FIG. 8, the imaging processor 802 includes an array of pixel sensors 805. Each example pixel sensor 805 of the imaging processor 802 includes a respective example photo detector (PD) 810 and an associated example processing element (PE) 815. Each PD 810 of the illustrated example determines image data (e.g., such as intensity, color, etc.) for a respective portion (e.g., such as a respective pixel) of an image region (e.g., field-of-view) supported by the imaging processor 802 as defined by the array of pixel sensors 805. As such, in the example systems 300, 400 and 700 described, the PDs 810 are optically coupled with the optical cable 325/600 via, for example, the interface lens 535 at the interface end 330/630 of the optical cable 325/600 to detect the sensed light (e.g., imaging information) conveyed along the optical cable 325/600 from its sensing end 335/635.

The size of the array of pixel sensors 805 determines the image resolution that can be obtained by the imaging processor 802. For example, the array of pixel sensors 805 can be dimensioned to include X rows by Y columns of sensors, where X and Y are chosen to provide a desired image resolution. Examples of (X,Y) dimensions for the array of pixel sensors 805 include, but are not limited to, (100,100), (600, 400), (800,600) (1024,768), etc., or any other appropriate pair of dimensions.

In the illustrated example, each PE 815 for each pixel sensor 805 of the imaging processor 802 includes an arithmetic and logic unit (ALU) and an internal memory. Additionally, the PE 815 in one cell is connected to and can communicate with the other PEs 815 (referred to herein as neighbor PEs) in the one or more (e.g., such as 4) adjacent, neighbor pixel sensors 805. In some examples, each PE 815 is able to perform arithmetic and logical operations on the image data obtained from the PD 810 in its own pixel sensor 805 and the image data obtained from the other PDs 810 (referred to herein as neighbor PDs 810) in the one or more (e.g., such as 4) adjacent, neighbor cells 805. In such an example, the PE 815 is connected to and can communicate with its own memory (e.g., which stores the image data from the PD 810 in its own cell 805) and the memories of the neighbor PEs 815 (e.g., which store the image data from the neighbor PDs 810).

In the illustrated example, each PE 815 for each pixel sensor 805 is programmable by the measurement processor 804 via any appropriate example decoder circuitry 820. For example, the measurement processor 804 can use the decoder circuitry 820 to send machine-readable instructions to one or more, or all, of the PEs 815. In some examples, the PEs 815 of the imaging processor 802 support parallel processing of the image data in their respective memories and neighbor memories, and the instructions can be single instruction multiple data (SIMD) instructions supporting such parallel processing. In the illustrated example, the processed image data resulting from the processing (e.g., parallel processing) performed by the PEs 815 can be read by or otherwise returned to the measurement processor 804 via any appropriate example output circuitry 825. Further examples of high speed imaging technologies that can be used to implement the imaging processor 802 are described in Masatoshi Ishikawa et al., "A CMOS Vision Chip with SIMD Processing Element Array for 1 ms Image Processing", *IEEE International Solid-State Circuits Conference* (*ISSCC* 1999), Dig. Tech. Papers, pp. 206-207, 1999, which is incorporated herein by reference in its entirety.

In an example operation of the imaging processor 802 and measurement processor 804 of FIG. 8, the measurement processor 804 uses the decoder circuitry 820 to program the PEs 815 of the pixel sensors 805 to cause the PDs 810 of the pixel sensors 805 to sense light in a field-of-view (e.g., to detect object(s) 715 and/or target(s) 730 in a remote environment). Each PD 810 processes the sensed light to determine image data, such as image intensity data, image color data, etc., for its respective portion of the image region (e.g., field-of-view) supported by the imaging processor 802. The image data determined by a particular PD 810 is stored in the memory of the respective PE 815 included in the same pixel sensor 805.

The measurement processor 804 then uses the decoder circuitry 820 to program each PE 815 for each pixel sensor 805 to process the image data stored in its memory (e.g., corresponding to the image data obtained from its associated PD 810) and the image data stored in the memories of the neighbor PEs 815 (e.g., corresponding to the image data obtained from the neighbor PDs 810) to determine object boundary information for one or more objects contained in the field-of-view. For example, the ALU of a particular PE 815 can perform operations, such as addition, subtraction, comparison, etc., to process the image data for its pixel sensor 805 and its neighbor pixel sensors 805 to determine whether the portion of the image region corresponding to the particular PE 815 is completely within or outside an object (e.g., of the image data for the entire neighborhood is substantially similar), or is at a boundary of the object (e.g., if the image data differs for different portions of neighborhood). In some examples, the boundary information can use a first value (e.g., 0) to represent pixels sensors determined to correspond to image regions completely within or outside an object, and a second value (e.g., 1) to represent pixel sensors determined to correspond to image regions at an object boundary.

After the PEs 815 determine the object boundary information by processing the image data for their respective neighborhoods, the measurement processor 804 uses the output circuitry 825 to read this object boundary information. The measurement processor 804 can then process the object boundary information to determine positioning data for object(s) in the currently configured field-of-view. For example, measurement processor 804 can use any appropriate image processing technique or techniques, such as edge detection, region growing, center of mass computation, etc., to process the object boundary information to determine the location(s) and size(s) of object(s) contained in the configured field-of-view of the imaging processor 802. Furthermore, the measurement processor 804 can count the number of objects detected in the field-of-view over time. In the illustrated example, the measurement processor 804 determines measurement data including, for example, coordinates (e.g., one, two or three dimensional coordinates) of the location(s) of object(s) detected in the field-of-view, size(s) of the object(s) detected in the field-of-view, number(s) of object(s) detected in the field-of-view (e.g., over time), etc. The measurement processor 804 then formats the measurement data for transmission to the surface (e.g., to the logging and control unit 140) via, for example, a telemetry communication link.

In some examples, the imaging processor 802 can provide a raw image formed from the image data obtained from each PD 810 to the measurement processor 804. In some examples, the measurement processor 804 may send the raw image, and even sequences of raw images (e.g., forming a video stream) to the surface (e.g., to the logging and control unit 140).

Figure 9:
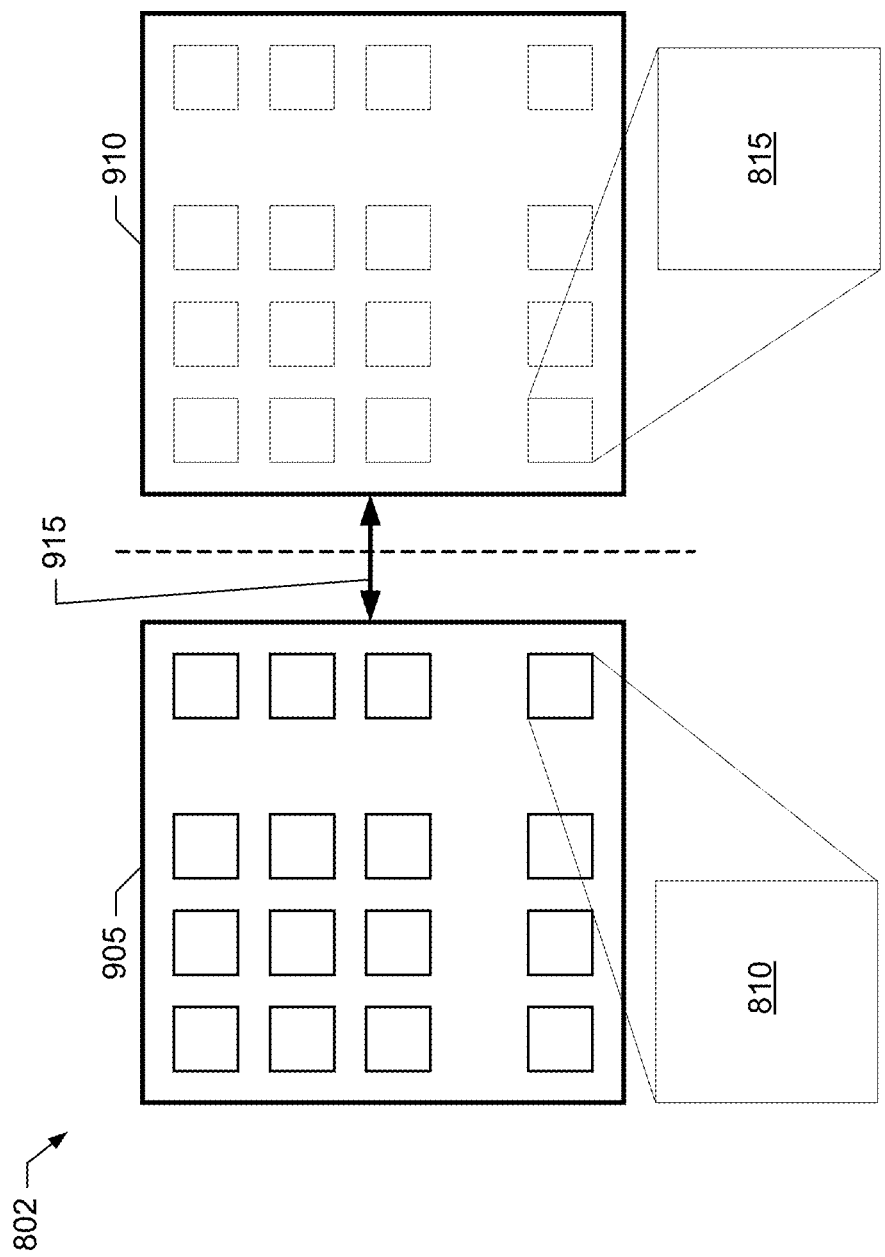
FIG. 9 illustrates an example implementation of the example imaging processor of FIG. 8.

A second example implementation of the imaging processor 802 of FIG. 8 is illustrated in FIG. 9. In the example of FIG. 9, the imaging processor 802 includes an example PD array chip 905 containing the PDs 810 for each pixel sensor 805, and a separate example PE array chip 910 containing the PEs 815 for each pixel sensor 805. The PD array chip 905 and the PE array chip 910 are interconnected via an example inter-chip communication link 915, which may be implemented by any type of communication circuitry, bus, etc. In the illustrated example, the PD array chip 905 and the PE array chip 910 are implemented using separate semiconductor devices. For example, the PD array chip 905 can be implemented by a semiconductor device containing complementary metal oxide semiconductor (CMOS) image sensors, and the PE array chip 910 can be implemented by a semiconductor device, such as a field programmable gate array (FPGA) and/or any other device capable of implementing the ALUs and memories making up the PEs 815 included in the PE array chip 910.

In the examples of FIGS. 8-9, the PDs 810 can be implemented using any type or combination of photonic sensors, such as optical sensors, electromagnetic sensors, etc. For example, the PDs can be implemented using CMOS-type photo detectors. As such, the PDs 810 can be used by the imaging processor 802 to detect and process objects in the field-of-view being measured. In some examples, the PDs 810 can include compensation circuitry to compensate for noise that occurs during high temperature operation.

Figure 10:
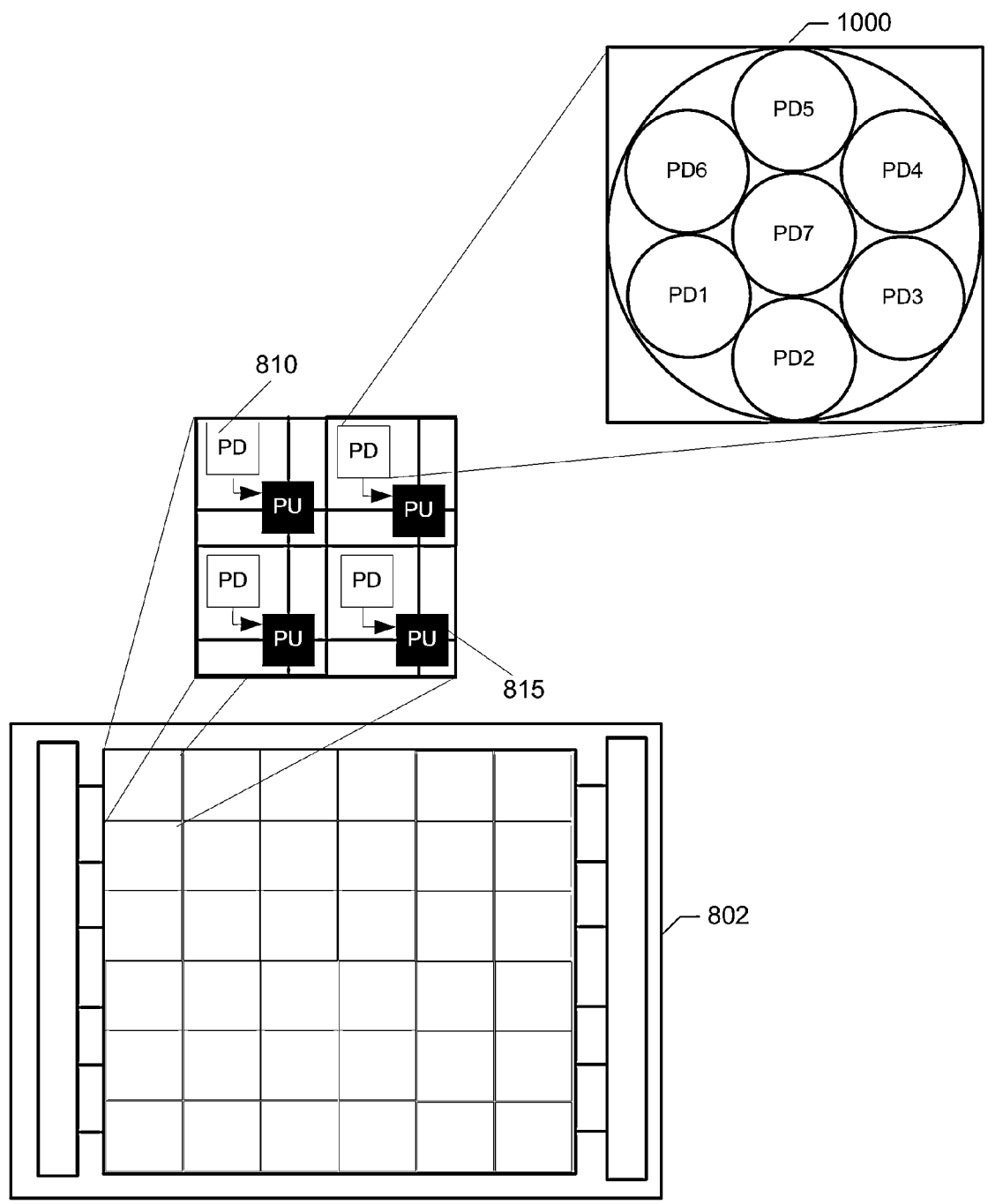
FIG. 10 illustrates an example photo detector that may be used to implement the imaging processors of FIGS. 8 and/or 9.
Figure 11:
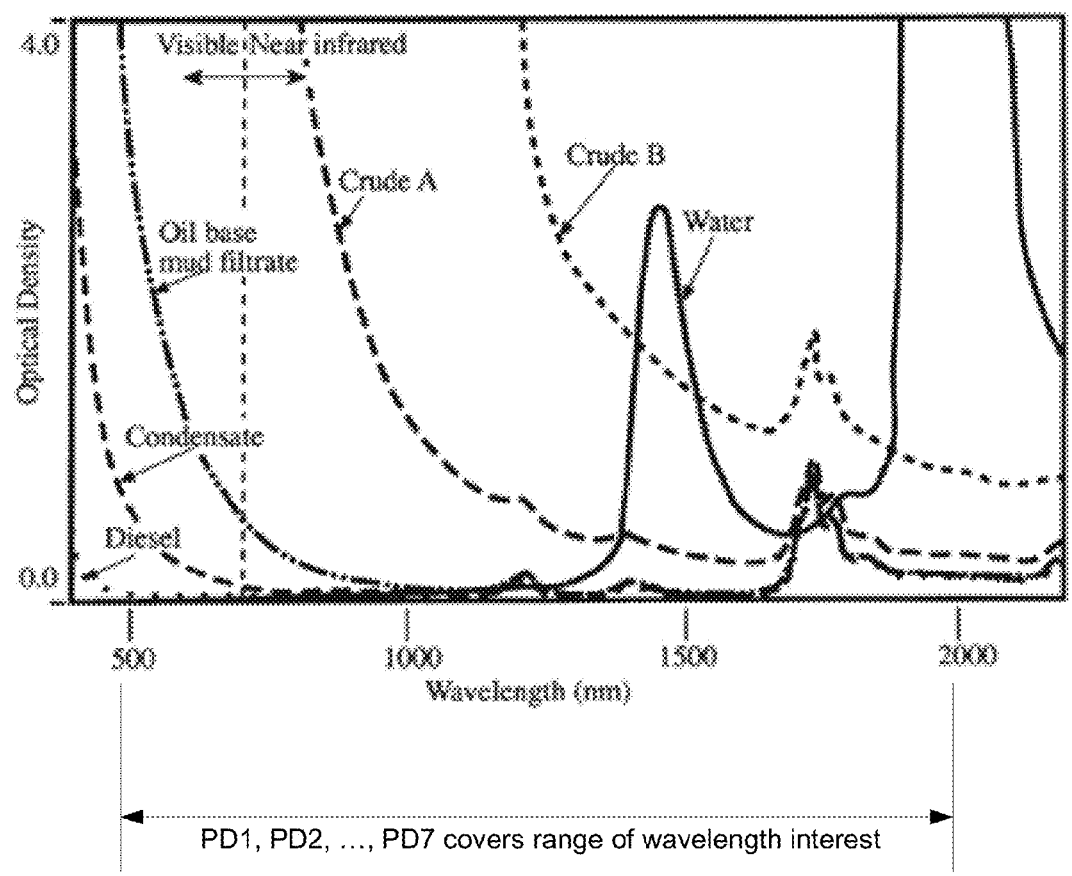
FIG. 11 illustrates example optical characteristics that can be sensed by the photo detector or FIG. 9.

FIG. 10 illustrates another example PD 1000 that may be used to implement the PDs 810 included in the example imaging processors 802 of FIGS. 8 and/or 9. The example PD 1000 of FIG. 10 includes multiple PD elements PD1-PD7 having different respective sensing characteristics. For example, the PD elements PD1-PD7 can correspond to multiple photo diodes or other photonic sensors having different light wavelength (e.g., color) sensitivities, as illustrated in FIG. 11. As illustrated in FIG. 11, the PD elements PD1-PD7 implementing the PD 1000 can be chosen to cover a range of wavelengths of interest based on the type(s) of object(s) 715 and/or target(s) 730 to be detected. Although seven PD elements PD1-PD7 are illustrated in the example of FIG. 10, the PD 1000 can include more or fewer PD elements as appropriate for a particular implementation.

In some examples, the imaging processor 802 can include one or more light magnification devices (not shown) to boost light intensity provided to the PDs 810 and/or 1000 described above. In some examples, the imaging processor 802 can include one or more filters to filter the light provided to the PDs 810 and/or 1000. In some examples, such filtering is uniform for all PDs 810 and/or 1000 of the imaging processor 802. However, in other examples, such as in the context of the example PD 1000 of FIG. 10, different filters can be used for the different PD elements PD1-PD7 implementing the PD 1000. For example, each PD element PD1-PD7 may have a respective filter having filter characteristics to pass a range of wavelengths matching the wavelength sensitivity of the particular PD element PD1-PD7. In some examples, the imaging processor 802 can additionally include a grating device to be used with the filter(s) that are to process the light provided to the PDs 810 and/or 1000.

Other example techniques for implementing the imaging system 320 are described in U.S. application Ser. No. 13/245,827, entitled "Imaging Methods and Systems for Downhole Fluid Analysis," which was filed on Sep. 26, 2011. U.S. application Ser. No. 13/245,827 is hereby incorporated by reference in its entirety.

While example manners of implementing the measurement tools 305, 405 and 705, have been illustrated in FIGS. 1-11, one or more of the elements, processes and/or devices illustrated in FIGS. 1-11 may be combined, divided, re-arranged, omitted and/or implemented in any other way. Further, the example imaging system 320, the example illumination system 340, the example orientation controller 410, the example flushing system 720, the example imaging processor 802, the example measurement processor 804, the example PDs 810 and/or 1000, the example PD elements PD1-PD7, the example PEs 815, the example decoder circuitry 820, the example output circuitry 825, the example PD array chip 905, the example PE array chip 910, the example inter-chip communication link 915 and/or, more generally, the example measurement tools 305, 405 and/or 705 may be implemented by hardware, software, firmware and/or any combination of hardware, software and/or firmware. Thus, for example, any of the example imaging system 320, the example illumination system 340, the example orientation controller 410, the example flushing system 720, the example imaging processor 802, the example measurement processor 804, the example PDs 810 and/or 1000, the example PD elements PD1-PD7, the example PEs 815, the example decoder circuitry 820, the example output circuitry 825, the example PD array chip 905, the example PE array chip 910, the example inter-chip communication link 915 and/or, more generally, the example measurement tools 305, 405 and/or 705 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example measurement tools 305, 405 and/or 705, the example imaging system 320, the example illumination system 340, the example orientation controller 410, the example flushing system 720, the example imaging processor 802, the example measurement processor 804, the example PDs 810 and/or 1000, the example PD elements PD1-PD7, the example PEs 815, the example decoder circuitry 820, the example output circuitry 825, the example PD array chip 905, the example PE array chip 910 and/or the example inter-chip communication link 915 are hereby expressly defined to include a tangible computer readable medium such as a memory, digital versatile disk (DVD), compact disk (CD), etc., storing such software and/or firmware. Further still, the example measurement tools 305, 405 and/or 705 may include one or more elements, processes and/or devices in addition to, or instead of, those illustrated in FIGS. 1-11, and/or may include more than one of any or all of the illustrated elements, processes and devices.

Flowcharts representative of example processes that may be executed to implement the example measurement tools 305, 405 and/or 705, the example imaging system 320, the example illumination system 340, the example orientation controller 410, the example flushing system 720, the example imaging processor 802, the example measurement processor 804, the example PDs 810 and/or 1000, the example PD elements PD1-PD7, the example PEs 815, the example decoder circuitry 820, the example output circuitry 825, the example PD array chip 905, the example PE array chip 910 and/or the example inter-chip communication link 915 are shown in FIGS. 12-15. In these examples, the process represented by each flowchart may be implemented by one or more programs comprising machine readable instructions for execution by a processor, such as the processor 1612 shown in the example processing system 1600 discussed below in connection with FIG. 16. In some examples, the entire program or programs and/or portions thereof implementing one or more of the processes represented by the flowcharts of FIGS. 12-15 could be executed by a device other than the processor 1612 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 12-15, or one or more portion(s) thereof, may be implemented manually. Further, although the example processes are described with reference to the flowcharts illustrated in FIGS. 12-15, many other techniques for implementing the example methods and apparatus described herein may be used. For example, with reference to the flowcharts illustrated in FIGS. 12-15, the order of execution of the blocks may be changed, and/or some of the blocks described may be changed, omitted, combined and/or subdivided into multiple blocks.

As mentioned above, the example processes of FIGS. 12-15 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. The example processes of FIGS. 12-15 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 12:
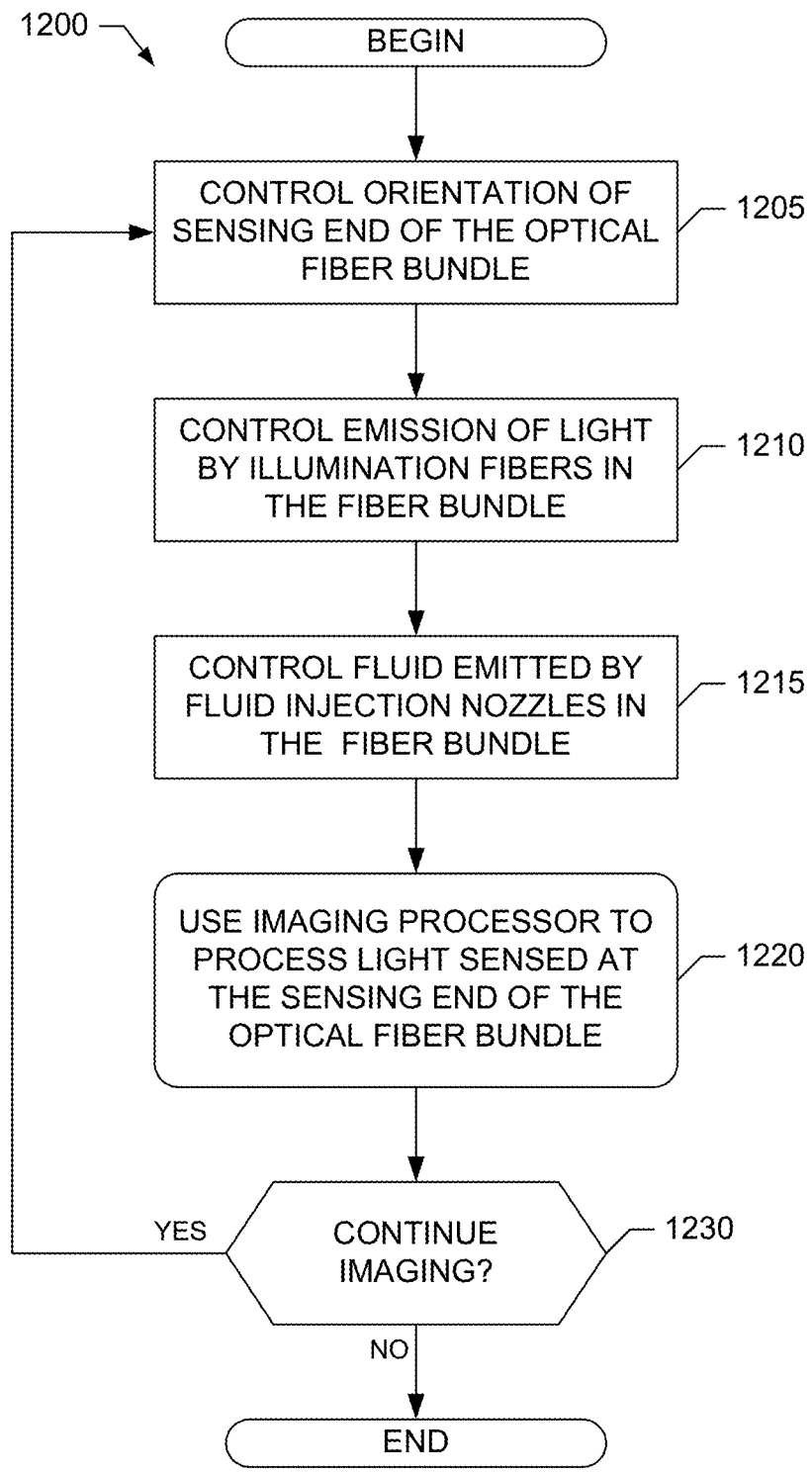
FIG. 12 is a flowchart representative of an example process that may be performed to implement one or more of the example measurement tools of FIGS. 3, 4 and/or 7.

An example process 1200 that may be executed to implement one or more of the example measurement tools 305, 405 and/or 705 is illustrated in FIG. 12. For convenience, and without loss of generality, operation of the example process 1200 is described primarily in the context of execution by the measurement tool 705 of FIG. 7. With reference to the preceding figures and associated descriptions, the process 1200 begins execution at block 1205 at which orientation controller 410 of the measurement tool 705 uses one or more actuators to control one or more force transmission cables included in and/or attached to the optical cable 600 to guide the sensing end 635 of the cable 600 to a remote observation area of interest. At block 1210, the illumination system 340 of the measurement tool 705 activates and controls one or more light sources that are optically coupled to one or more illumination fibers 525 included in the optical cable 600. The illumination fiber(s) 525 convey the source light along the length of the cable 600 and emit the source light from the sensing end 635 of the cable 600 to illuminate a field of view in the remote observation area. At block 1215, the flushing system 720 of the measurement tool 705 controls (e.g., via one or more valves) the flushing fluid 725 provided to the optical cable 600 and conveyed via cable's fluid conveying region 605 to the nozzle(s) 620 at the sensing end 635 of the cable 600. The nozzles emit the flushing fluid 725 in the remote observation area to clear the field-of-view, clean the sensing lens 530, clean target area(s) 730 of object(s) 715 to be examined, etc.

At block 1220, the imaging system 320 of the measurement tool 705 processes the sensed light (also referred to as imaging information) that is sensed in the remote observation area in a field of view of the sensing lens 530, which is included in the sensing end 635 of the cable 600. The sensed light is conveyed by the imaging fibers 515 from the sensing end 635, along the length of the optical cable 600, to the interface end 630 of the cable. The imaging system 320 is optically coupled to the interface end 630 of the cable 600 (e.g., via the interface lens 535) and receives the sensed light conveyed via the optical cable 600 from the remote observation area. The imaging system 320 then processes the sensed light (i.e., imaging information) to determine measurement information to be reported to, for example, a logging and control unit 140 located at the surface or otherwise outside of the formation, as described above. The measurement data obtained at block 1220 may include, for example, positioning data for object(s) 715 and/or target(s) 730, counts of the number of object(s) 715 and/or target(s) 730, etc., included in the field-of-view of the sensing end 635 of the optical cable 600. An example process that may be executed to perform the processing at block 1220 is illustrated in FIG. 13, which is described in greater detail below.

At block 1230, the measurement tool 705 determines whether imaging-based measurement of the remote observation area is to continue. If imaging-based measurement is to continue (block 1230), then processing returns to block 1205 and blocks subsequent thereto. However, if imaging-based measurement is not to continue (block 1230), execution of the example process 1200 ends.

Figure 13:
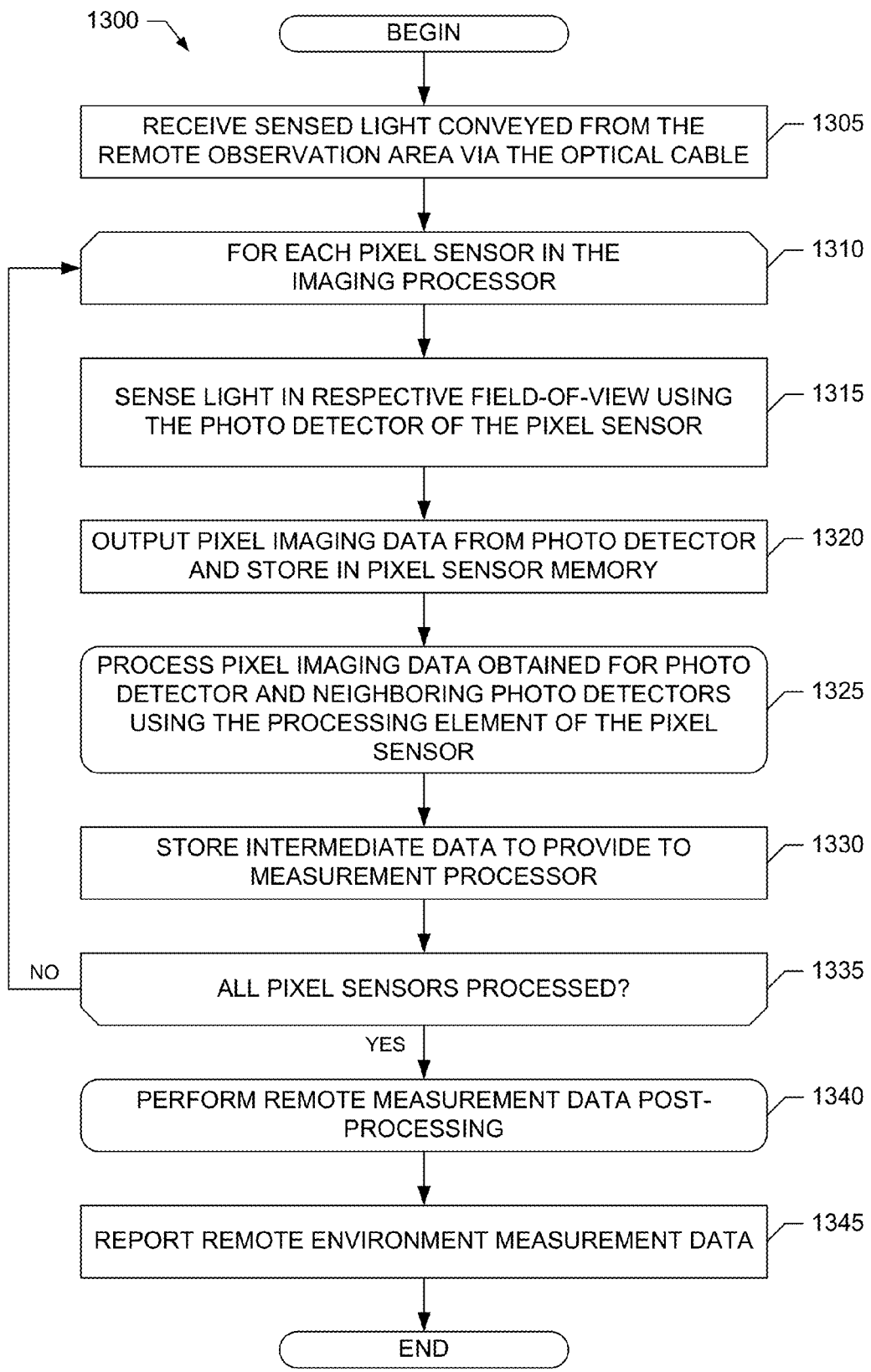
FIG. 13 is a flowchart representative of an example process that may be performed to determine measurement data using the example measurement tools of FIGS. 3, 4 and/or 7, and/or in the example process of FIG. 12.

An example process 1300 that may be executed to implement the example imaging system 320 of FIGS. 3, 4 and/or 7 is illustrated in FIG. 13. For convenience, and without loss of generality, operation of the example process 1300 is described in the context of execution by the imaging system 320 when implemented using the example imaging processor 802 the example measurement processor 804 of FIG. 8 and using the optical cable 325 illustrated in FIG. 5. With reference to the preceding figures and associated descriptions, the process 1300 of FIG. 13 begins execution at block 1305 at which the imaging processor 802 receives the sensed light (i.e., imaging information) conveyed via the imaging fibers 515 from the sensing end 335 of the optical cable 325, along the length of the cable 325, to the interface end 330 that is optically coupled with the imaging processor 802. Such optical coupling may be achieved using the interface lens 535, which focuses the sensed light over the PDs 810 in the array of pixel sensors 805 of the imaging processor 802.

Next, at block 1310, each pixel sensor 805 in the imaging processor 802 of the imaging system 320 operates as follows. At block 1315, the PD 810 in each pixel sensor 805 is to sense the light received via the optical cable 325 at block 1305. At block 1320, the PD 810 of each pixel sensor 805 outputs image data (e.g., intensity, color, etc.) based on the sensed light and stores the image data in the memory of the respective PE 815 associated with the particular PD 810. At block 1325, the PE 815 of each pixel sensor 805 processes the image data obtained by its associated PD 810 and its adjacent neighbor PDs 810, as described above. For example, at block 1325, the PE 815 of each pixel sensor 805 can determine object boundary information for its portion of the image region (e.g., field-of-view) supported by the imaging system 320 by processing the image data obtained from its memory and the memories of its neighbor pixel sensors 805, as described above. At block 1330, the imaging processor 802 stores the intermediate data determined by the PE 815 of each pixel sensor 805 for retrieval by the measurement processor 804 of the imaging system 320. At block 1335, processing continues until all pixel sensors 805 have completed their respective processing. Although the processing performed by blocks 1310-1335 is depicted as being serial processing in the example of FIG. 13, the processing performed by blocks 1310-1335 can be parallel processing, as described above, or a combination of parallel and serial processing.

At block 1340, the measurement processor 804 of the imaging system 320 retrieves the intermediate data determined by the imaging processor 802 and post-processes the intermediate data to determine imaging measurement data. For example, the measurement processor 804 can process object boundary intermediate data determined by the imaging processor 802 to determine positioning data describing location(s) and/or size(s) of object(s) 715 detected in the field-of-view of the sensing end 335 of the optical cable 325, number(s) of object(s) 715 in the field-of-view of the sensing end 335 of the optical cable 325, etc., as described above. The measurement processor 804 can also format the resulting measurement data for transmission via a telemetry communication link to, for example, the logging and control unit 140, as described above. At block 1345, the measurement processor 804 reports the measurement data determined at block 1340 to the logging and control unit 140, as described above.

Figure 14:
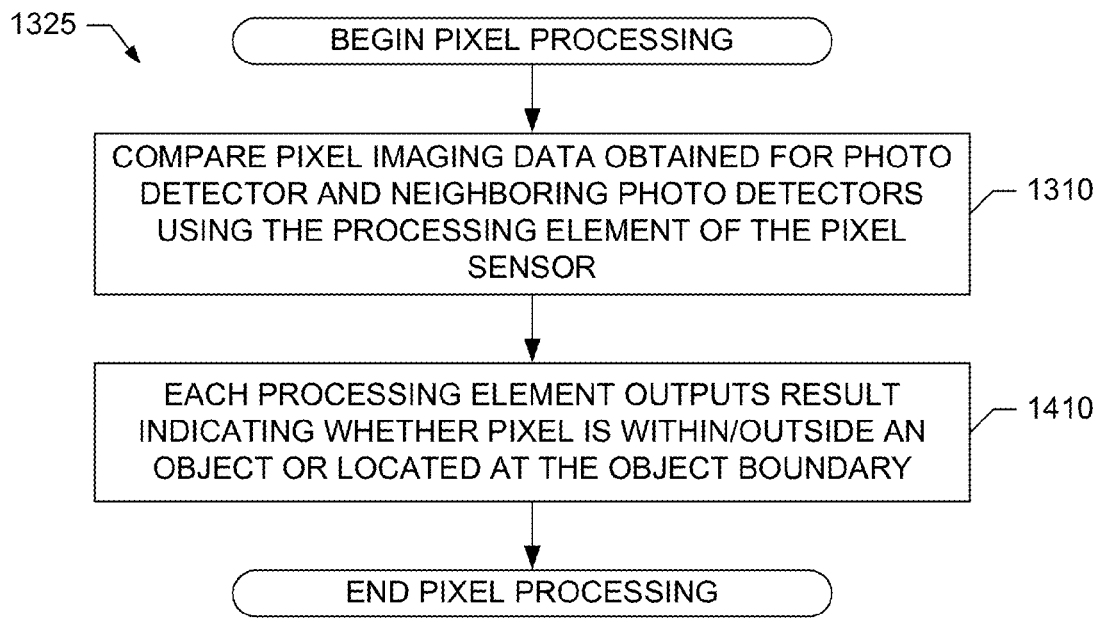
FIG. 14 is a flowchart representative of an example process that may be performed to implement pixel processing in the example imaging systems of FIGS. 8 and/or 9, and/or in the example process of FIG. 13.

An example process 1325 that can be used to implement the processing at block 1325 of FIG. 13 and/or pixel sensor processing in the imaging processor 802 is illustrated in FIG. 14. With reference to the preceding figures and associated descriptions, the process 1325 of FIG. 14 begins execution at block 1405 at which the PE 815 in each pixel sensor 805 of the imaging processor 802 compares image data obtained from its associated PD 810 with image data obtained from the PDs 810 of the adjacent neighbor pixel sensors 805. For example, if the PE 815 in a particular pixel sensor 805 determines that the image data obtained from its associated PD 810 is substantially similar to the image data obtained from the PDs 810 of the adjacent neighbor pixel sensors 805, then the PE 815 in the particular pixel sensor 805 can further determine that its pixel sensor 805 is associated with an image pixel that is either entirely within or outside an object 715 in the field-of-view being analyzed. However, if the PE 815 in a particular pixel sensor 805 determines that the image data obtained from its associated PD 810 is substantially different from image data obtained from the PDs 810 of one or more adjacent neighbor pixel sensors 805, then the PE 815 in the particular pixel sensor 805 can further determine that its pixel sensor 805 is associated with an image pixel that is at a boundary of an object 715 in the field-of-view being analyzed.

At block 1410, the PE 815 in each pixel sensor 805 outputs an intermediate result indicating whether the image pixel associated with the pixel sensor 805 is located at a boundary of an object, or the image pixel is located entirely within or outside an object (or, in other words, is not at a boundary of an object). For example, the PE 815 can use a first value to indicate that it is associated with an image pixel at an object boundary, and a second value to indicate that it is associated with an image pixel that is not at an object boundary.

Figure 15:
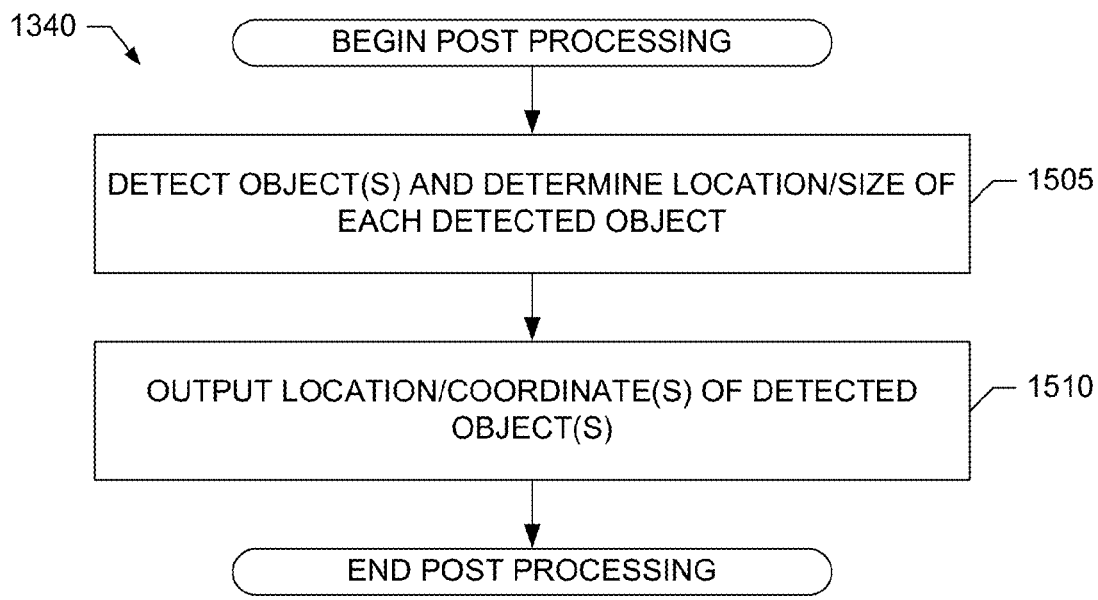
FIG. 15 is a flowchart representative of an example process that may be performed to implement post-processing in the example imaging systems of FIGS. 8 and/or 9, and/or in the example process of FIG. 13.

An example process 1340 that can be used to implement the processing at block 1340 of FIG. 13 and/or post-processing in the measurement processor 804 is illustrated in FIG. 15. With reference to the preceding figures and associated descriptions, the process 1340 of FIG. 15 begins execution at block 1505 at which the measurement processor 804 processes intermediate data (e.g., object boundary information) obtained from the imaging processor 802 to detect object(s) in the field-of-view being analyzed, and the location(s) and size(s) of the detected object(s), as described above. At block 1510, the measurement processor 804 outputs measurement data based on the object location information determined at block 1505. For example, and as described above, the measurement processor 804 can provide the measurement data to the logging and control unit 140 for further analysis.

Figure 16:
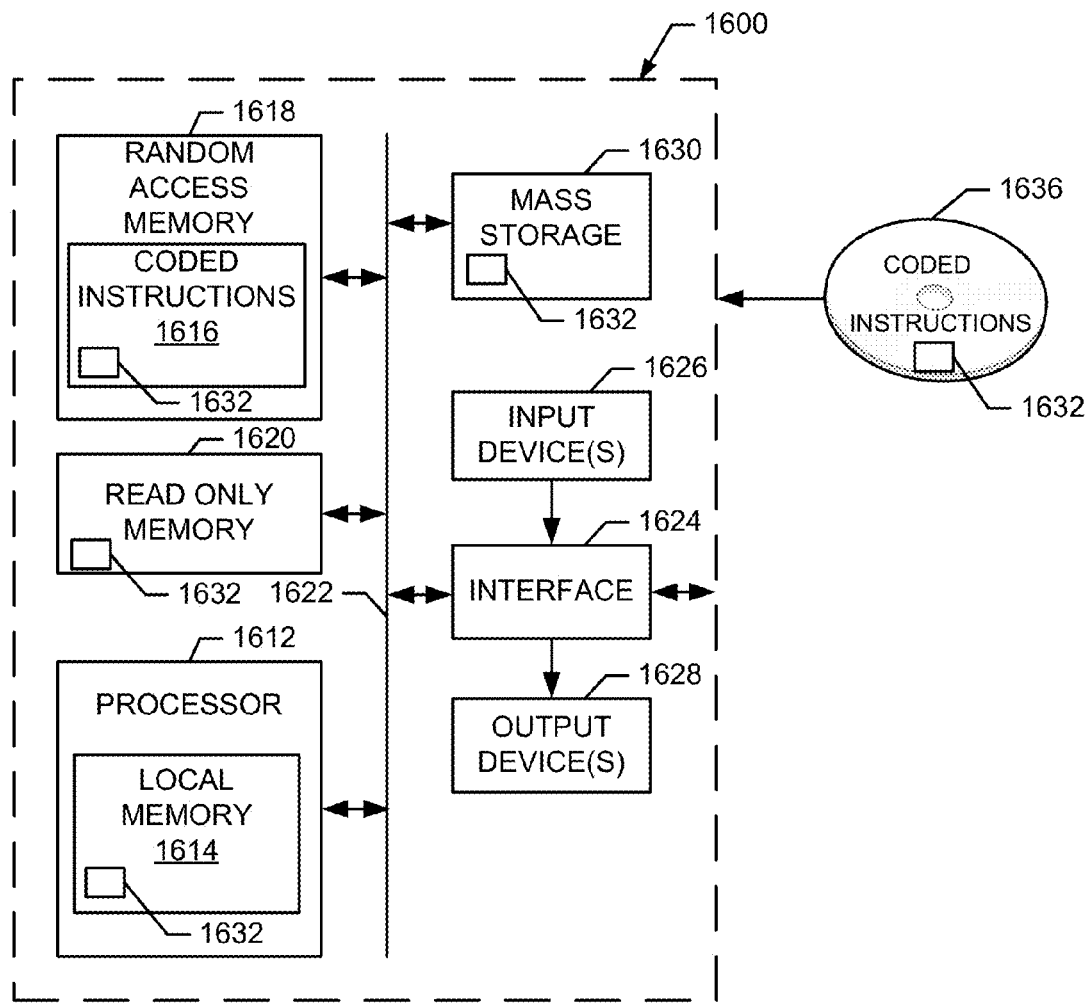
FIG. 16 is a block diagram of an example processing system that may execute example machine readable instructions used to implement one or more of the processes of FIGS. 12-14 and/or 15 to implement the example measurement tools of FIGS. 3, 4 and/or 7 and/or the example imaging system of FIGS. 8-9.

FIG. 16 is a block diagram of an example processing system 1600 capable of implementing the apparatus and methods disclosed herein. The processing system 1600 can be, for example, a smart controller, a special-purpose computing device, a server, a personal computer, a personal digital assistant (PDA), a smartphone, an Internet appliance, etc., or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, machine readable instructions to implement the processes represented in FIGS. 12-15. The processor 1612 may be any type of processing unit, such as one or more Intel® microprocessors from the Pentium® family, the Itanium® family and/or the XScale® family, one or more microcontrollers from the ARM® and/or PICO families of microcontrollers, one or more embedded soft/hard processors in one or more FPGAs, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 may be controlled by a memory controller (not shown).

The processing system 1600 also includes an interface circuit 1624. The interface circuit 1624 may be implemented by any type of interface standard, such as an Ethernet interface, a universal serial bus (USB), and/or a PCI express interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, a trackbar (such as an isopoint), a voice recognition system and/or any other human-machine interface.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, may include a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1600 also includes one or more mass storage devices 1630 for storing machine readable instructions and data. Examples of such mass storage devices 1630 include floppy disk drives, hard drive disks, compact disk drives and digital versatile disk (DVD) drives.

Coded instructions 1632 to implement the processes of FIGS. 12-15 may be stored in the mass storage device 1630, in the volatile memory 1618, in the non-volatile memory 1620, in the local memory 1614 and/or on a removable storage medium, such as a CD or DVD 1636.

As an alternative to implementing the methods and/or apparatus described herein in a system such as the processing system of FIG. 16, the methods and or apparatus described herein may be embedded in a structure such as a processor and/or an ASIC (application specific integrated circuit).

Although a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system for downhole measurement, the system comprising:
a tool to be positioned downhole in a formation, the tool comprising:
an imaging system to determine measurement information from imaging information obtained by sensing light; and
an illumination system to control source light to be emitted by the tool; and
an optical cable to sense an optical field of view that is remote from the tool, the optical cable including an optical fiber bundle to optically couple with the imaging system and the illumination system, the optical fiber bundle comprising:
a bundle of imaging fibers to convey the imaging information from a sensing end of the optical cable, along a length of the optical cable, to the imaging system;
a plurality of illumination fibers positioned outside the bundle of imaging fibers, the illumination fibers to convey the source light from the tool, along the length of the optical cable, to the sensing end of the cable, the illumination fibers to emit the source light to illuminate the optical field of view; and
a force transmission cable to transmit a mechanical force along the length of the optical cable to control movement at the sensing end of the optical cable, and the tool further comprises an orientation controller to control the mechanical force applied to the force transmission cable to adjust an orientation of the sensing end of the optical cable,
wherein the imaging system comprises:
a plurality of photo detectors to sense the imaging information conveyed from the sensing end of the optical cable by the bundle of imaging fibers, a plurality of processing elements, each processing element being associated with a respective photo detector and to process first image data obtained from the respective photo detector and second image data obtained from at least one neighbor photo detector to determine object boundary information for an object in the optical field-of-view; and a measurement processor to determine location information for the object based on the object boundary information determined by the plurality of processing elements, the location information to be included in the measurement information.

2. An optical cable for downhole imaging applications, the optical cable comprising:

an optical fiber bundle comprising a bundle of imaging fibers to convey imaging information along a length of the optical cable;

a fluid conveying region located between an exterior surface of the optical fiber bundle and an interior surface of the optical cable; and a nozzle included in a sleeve covering a sensing end of the optical cable, the nozzle positioned over the fluid conveying region to emit fluid conveyed via the fluid conveying region, wherein the fluid conveying region comprises a plurality of channels formed between the exterior surface of the optical fiber bundle and the interior surface of the optical cable, the plurality of channels extending through the length of the optical cable.

3. An optical cable as defined in claim 2 further comprising a plurality of nozzles included in the sleeve covering the sensing end of the optical cable, at least two of the nozzles being positioned over one of the channels to direct fluid that is to be emitted from the one of the channels.

4. An optical cable for downhole imaging applications, the optical cable comprising:

an optical fiber bundle comprising a bundle of imaging fibers to convey imaging information along a length of the optical cable;

a fluid conveying region located between an exterior surface of the optical fiber bundle and an interior surface of the optical cable; and a nozzle included in a sleeve covering a sensing end of the optical cable, the nozzle positioned over the fluid conveying region to emit fluid conveyed via the fluid conveying region, wherein the optical fiber bundle further comprises a plurality of illumination fibers positioned outside the bundle of imaging fibers, the illumination fibers to convey light along the length of the optical cable, the light to be emitted at the sensing end of the optical cable, wherein the imaging fibers and the illumination fibers have different polarizations to reduce interference in the imaging information conveyed by the imaging fibers that is caused by the light conveyed by the illumination fibers.

5. A method for downhole measurement, the method comprising:

positioning a tool downhole in a formation, the tool comprising:

an imaging system to determine measurement information from imaging information obtained by sensing light; and an illumination system to control source light to be emitted by the tool; and using an optical cable to sense an optical field of view that is remote from the tool, the optical cable including an optical fiber bundle to optically couple with the imaging system and the illumination system, the optical fiber bundle comprising:

a bundle of imaging fibers to convey the imaging information from a sensing end of the optical cable, along a length of the optical cable, to the imaging system;

a plurality of illumination fibers positioned outside the bundle of imaging fibers, the illumination fibers to convey the source light from the tool, along the length of the optical cable, to the sensing end of the cable, the illumination fibers to emit the source light to illuminate the optical field of view; and using a fluid conveying region of the optical cable, which is located between an exterior surface of the optical fiber bundle and an interior surface of the optical cable, to convey fluid from the tool to the sensing end of the optical cable;

using a nozzle, which is included in a sleeve covering the sensing end of the optical cable, to emit the fluid conveyed from the tool via the fluid conveying region of the optical cable; and using a plurality of nozzles included in the sleeve covering the sensing end of the optical cable to at least one of direct or diffuse the fluid to be emitted from the sensing end of the optical cable.

6. A method for downhole measurement, the method comprising:

positioning a tool downhole in a formation, the tool comprising:

an imaging system to determine measurement information from imaging information obtained by sensing light; and an illumination system to control source light to be emitted by the tool; and using an optical cable to sense an optical field of view that is remote from the tool, the optical cable including an optical fiber bundle to optically couple with the imaging system and the illumination system, the optical fiber bundle comprising:

a bundle of imaging fibers to convey the imaging information from a sensing end of the optical cable, along a length of the optical cable, to the imaging system; and a plurality of illumination fibers positioned outside the bundle of imaging fibers, the illumination fibers to convey the source light from the tool, along the length of the optical cable, to the sensing end of the cable, the illumination fibers to emit the source light to illuminate the optical field of view, wherein the imaging system comprises a plurality of photo detectors, a plurality of processing, each processing element being associated with a respective photo detector, and a measurement processor, and the method further comprises:

using the plurality of photo detectors to sense the imaging information conveyed from the sensing end of the optical cable by the bundle of imaging fibers, using each processing element to process first image data obtained from the respective photo detector associated with the processing element and second image data obtained from at least one neighbor photo detector to determine object boundary information for an object in the optical field-of-view; and using the measurement processor to determine location information for the object based on the object boundary information determined by the plurality of processing elements, the location information to be included in the measurement information.

* * * * *